United States Patent
Kabashima et al.

(10) Patent No.: US 8,396,644 B2
(45) Date of Patent: Mar. 12, 2013

(54) CONTROL DEVICE FOR INTERNAL COMBUSTION ENGINE

(75) Inventors: Hajime Kabashima, Saitama (JP); Yasuhiro Urata, Saitama (JP); Kazushi Yamamoto, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 399 days.

(21) Appl. No.: 12/764,720

(22) Filed: Apr. 21, 2010

(65) Prior Publication Data

US 2010/0268442 A1    Oct. 21, 2010

(30) Foreign Application Priority Data

Apr. 21, 2009 (JP) .................................. 2009-103251

(51) Int. Cl.
*F02B 7/00* (2006.01)

(52) U.S. Cl. ........ 701/103; 701/110; 123/431; 123/525; 123/436; 123/472

(58) Field of Classification Search .................. 123/1 A, 123/27 GE, 525, 431, 575, 198 A, 436, 672, 123/687, 472, 3, DIG. 12; 701/103–105, 701/110

See application file for complete search history.

(56) References Cited

U.S. PATENT DOCUMENTS

| | | | |
|---|---|---|---|
| 5,007,381 A | 4/1991 | Kakegawa et al. | |
| 6,513,505 B2* | 2/2003 | Watanabe et al. | 123/525 |
| 6,845,608 B2* | 1/2005 | Klenk et al. | 60/274 |
| 7,089,907 B2* | 8/2006 | Shinagawa et al. | 123/295 |
| 7,290,504 B2* | 11/2007 | Lange | 123/1 A |
| 7,448,348 B2* | 11/2008 | Shinagawa et al. | 123/3 |
| 7,861,696 B2* | 1/2011 | Lund | 123/525 |
| 8,166,956 B2* | 5/2012 | Ulrey et al. | 123/525 |
| 2008/0245318 A1* | 10/2008 | Kuroki et al. | 123/3 |
| 2009/0150050 A1* | 6/2009 | Mashida et al. | 701/103 |

FOREIGN PATENT DOCUMENTS

| | | |
|---|---|---|
| EP | 1983169 A1 | 10/2008 |
| JP | 2004-190586 A | 7/2004 |
| JP | 2007-507641 A | 3/2007 |
| WO | WO-01/86127 A2 | 11/2001 |
| WO | WO-01/86128 A2 | 11/2001 |
| WO | WO-2005/033493 A1 | 4/2005 |

* cited by examiner

*Primary Examiner* — Hai Huynh
(74) *Attorney, Agent, or Firm* — Arent Fox LLP

(57) ABSTRACT

A control device for an internal combustion engine employing PCCI combustion, capable of realizing high-stability operation of the engine throughout a large operation area, is provided. The engine control device comprises a fuel supply system which supplies light oil or mixed fuel containing light oil to the engine, a gas supply system which supplies hydrogen to the engine, and a required premixed gas calculating unit which previously stores and uses multiple combustion waveforms (changing depending on hydrogen addition concentration) as data. The required premixed gas calculating unit selects one of the combustion waveforms so as to achieve high thermal efficiency depending on the status of the engine and determines the hydrogen addition concentration (addition concentration of the hydrogen to be supplied to the engine) corresponding to the selected combustion waveform, by which the generation of PM and NOx can be reduced while also improving the thermal efficiency of the engine.

16 Claims, 18 Drawing Sheets

(b)

CONTROL DEVICE FOR INTERNAL COMBUSTION ENGINE

CROSS REFERENCE TO RELATED APPLICATIONS

This application claims the foreign priority benefit under 35 U.S.C. §119 of Japanese Patent Application No. 2009-103251 filed on Apr. 21, 2009, the disclosure of which is incorporated herein by reference.

BACKGROUND OF THE INVENTION

1. Field of the Invention

The present invention relates to a control device for an internal combustion engine, and in particular, to a control device for an internal combustion engine employing PCCI (Premixed Charge Compression Ignition) combustion, capable of realizing high-stability operation of the engine throughout a large operation area of the engine.

2. Description of the Related Art

In the conventional diffusive combustion method widely employed for diesel engines, combustion of fuel in each combustion chamber is attained by causing self ignition of the fuel, by compressing air introduced into the combustion chamber and injecting the fuel into the compressed air. Although such a diesel engine exhibits higher thermal efficiency compared to gasoline engines, the air-fuel mixture density in the combustion chamber tends to be highly non-uniform (due to uneven distribution of the injected (sprayed) fuel in the combustion chamber) and the combustion in the combustion chamber is likely to separate into a combustion region of spraying flames and an air region, resulting in highly uneven combustion temperature distribution in the combustion chamber. This means that a region with excessively high fuel concentration, a region at excessively high temperature, etc. (i.e., a region in which PM (Particulate Matter) tends to be generated, a region in which NOx tends to be generated, etc.) coexist in the combustion chamber. Therefore, it is difficult to reduce both NOx and PM at the same time, and this leads to high emission of NOx and PM and a heavy load on the exhaust post-processing system.

In consideration of the above problems, improvement of combustion by means of premixed combustion has been discussed in recent years with increasing attention in order to drastically reduce the emission of NOx and PM while securing low fuel consumption (high mileage). For the combustion improvement of diesel engines by means of premixed combustion, two combustion methods, HCCI (Homogeneous Charge Compression Ignition) combustion and PCCI (Premixed Charge Compression Ignition) combustion, are being considered.

The HCCI combustion is based on the idea of uniformly mixing air and fuel in the intake pipe (as in gasoline engines), introducing the uniform (homogeneous) air-fuel mixture into the combustion chamber, and attaining combustion by causing the self ignition by compression.

In the HCCI combustion method, the air-fuel mixture is introduced into the combustion chamber in the intake stroke after injecting the fuel into the intake port and preparing a uniform (homogeneous) air-fuel mixture. With the sufficient mixing of fuel and air, the whole air-fuel mixture is kept in a lean condition, by which the occurrence of air-fuel ratios close to the theoretical mixture ratio (generally occurring in diesel engines) is prevented and low combustion temperature is achieved, leading to substantially no generation/emission of NOx. However, combustion of all the fuel in the combustion chamber is difficult and fuel adhering to the inner surface of the cylinder is discharged without combustion, resulting in high emission of HO (hydrocarbon). Further, the thermal efficiency tends to be relatively low in HCCI combustion since the control of ignition timing is difficult and is dependent on the temperature in the cylinder (combustion chamber) being compressed.

On the other hand, PCCI combustion is based on the idea of executing the premixing (of fuel and air) by injecting the fuel into the cylinder in the compression stroke similarly to ordinary diesel engines. While the fuel injection timing in conventional diesel engines is approximately BTDC (Before Top Dead Center) 10 degrees or later in terms of the crank angle, the PCCI combustion method (focusing on increasing the turbulent mixing speed rather than increasing the air-fuel mixing time) aims to start the ignition after completion of the fuel injection, while also delaying the fuel injection timing compared to conventional combustion methods.

With ignition timing delayed by 10-15 degrees compared to conventional diesel engines, the compression ignition is carried out to the premixed air-fuel mixture that has already been attenuated to some extent, by which combustion at low temperature, with no NOx generation and with less PM generation is realized.

FIG. 20 is a graph showing a PM generation area and a NOx generation area in regard to local temperature and local equivalence ratio. As shown in FIG. 20, PM is generated in a part with high local equivalence ratio (i.e., with excessively high fuel concentration) due to lack of oxygen, while NOx is generated in a part with low local equivalence ratio and high local temperature.

As indicated with the broken line Y, the conventional diffusive combustion (executing the compression ignition to unevenly-distributed sprayed fuel) occurs in a large area extending across both the PM generation area and the NOx generation area In contrast, as indicated with the solid line X, the PCCI combustion (executing the compression ignition to properly attenuated air-fuel mixture and thereby reducing the region with excessively high fuel concentration and the region at excessively high temperature compared to the conventional diffusive combustion) is capable of decreasing the generation of PM and NOx.

About PCCI combustion engines of this kind, a variety of studies has been conducted in these years. For example, Japanese Patent Application Publication Nos. 2003-532828 and 2003-532829 (hereinafter referred to as "patent documents #1 and #2"), aiming to further improve emission quality of exhaust gas by increasing combustion efficiency and reducing unburned HC and CO (carbon monoxide), have disclosed an engine equipped with a mixing device for supplying premixed air-fuel mixture by mixing a first fuel with the intake air and a direct fuel injector for injecting a second fuel directly into the combustion chamber. In this engine, the direct injection of the second fuel is carried out after the premixed air-fuel mixture has ignited in the combustion chamber. As the first and second fuels, combinations of various kinds of fuels (natural gas, gasoline, light oil, naphtha, propane gas, etc.) are disclosed in the patent document #1 and #2.

However, in an internal combustion engine employing the conventional PCCI combustion method described in the patent document #1 and #2, the combustion progresses too rapidly in a middle/high-load operation area of the engine, causing loud noise and strong vibration.

While it is possible to alleviate these problems to some extent by using fuel with a high cetane number or by delaying the fuel injection timing compared to the standard injection timing of the internal combustion engine, the method delaying the fuel injection timing is also known to seriously deteriorate fuel consumption (mileage) and stability of ignition and combustion. Since internal combustion engines employing the PCCI combustion have the above problems in the middle/high-load operation area, the PCCI combustion method in the present state can be only used in a low-load operation area.

SUMMARY OF THE INVENTION

The primary object of the present invention, which has been made to resolve the above problems, is to provide a control device for an internal combustion engine employing PCCI (Premixed Charge Compression ignition) combustion, capable of realizing high-stability operation of the engine throughout a large operation area of the engine.

In accordance with an aspect of the present invention, there is provided a control device for an internal combustion engine operable with light oil or mixed fuel containing light oil, comprising: a fuel supply unit which supplies the light oil or the mixed fuel containing light oil to the internal combustion engine; a gas supply unit which supplies hydrogen to the internal combustion engine; a combustion control unit which controls combustion in the internal combustion engine by use of combustion data related to hydrogen addition concentration previously obtained from multiple combustion waveforms changing depending on the hydrogen addition concentration; and a hydrogen addition quantity determining unit which determines the addition concentration of the hydrogen to be supplied to the internal combustion engine by selecting appropriate data from the combustion data related to the hydrogen addition concentration so as to achieve high thermal efficiency based on status of the internal combustion engine.

In the control device configured as above, the addition concentration of the hydrogen to be supplied to the internal combustion engine is determined by selecting appropriate data from the combustion data related to the hydrogen addition concentration so as to achieve high thermal efficiency based on the status of the internal combustion engine (which is represented by revolution speed of the internal combustion engine and required torque (torque that the internal combustion engine is required to output), for example). Thus, from a range of hydrogen addition concentrations suitable for PCCI (Premixed Charge Compression Ignition) combustion, a hydrogen addition concentration representing a combustion waveform achieving high thermal efficiency of the internal combustion engine can be selected (i.e., the hydrogen addition concentration range suitable for PCCI combustion can be further narrowed down in consideration of the thermal efficiency). Consequently, the generation (generation rates) of PM and NOx can be reduced while also improving the thermal efficiency of the internal combustion engine.

In accordance with another aspect of the present invention, there is provided a control device for an internal combustion engine operable with light oil or mixed fuel containing light oil, comprising: a fuel supply unit which supplies the light oil or the mixed fuel containing light oil to the internal combustion engine; a gas generating unit which generates reformed gas containing hydrogen from the light oil or the mixed fuel containing light oil; a gas supply unit which supplies the reformed gas containing hydrogen to the internal combustion engine; a combustion control unit which controls combustion in the internal combustion engine by use of combustion data related to hydrogen addition concentration previously obtained from multiple combustion waveforms changing depending on the hydrogen addition concentration; and a hydrogen addition quantity determining unit which determines the addition concentration of the hydrogen to be supplied to the internal combustion engine by selecting appropriate data from the combustion data related to the hydrogen addition concentration so as to achieve high thermal efficiency based on status of the internal combustion engine.

In the control device configured as above, reformed gas containing hydrogen is generated from light oil or mixed fuel containing light oil and the combustion data related to hydrogen addition concentration (previously obtained from multiple combustion waveforms changing depending on the hydrogen addition concentration) is used. The addition concentration of the hydrogen to be supplied to the internal combustion engine is determined by selecting appropriate data from the combustion data related to the hydrogen addition concentration so as to achieve high thermal efficiency based on the status of the internal combustion engine (which is represented by the revolution speed of the internal combustion engine and the required torque, for example). Thus, from a range of hydrogen addition concentrations suitable for PCCI combustion, a hydrogen addition concentration representing a combustion waveform achieving high thermal efficiency can be selected (i.e., the hydrogen addition concentration range suitable for PCCI combustion can be further narrowed down in consideration of the thermal efficiency). Consequently, the generation of PM and NOx can be reduced while also improving the thermal efficiency of the internal combustion engine. Further, since the reformed gas containing hydrogen is generated from the light oil or the mixed fuel containing light oil, supply of the reformed gas (containing hydrogen) to the internal combustion engine by use of a special source of the reformed gas becomes unnecessary, which is convenient and advantageous for the operation of the internal combustion engine.

Preferably, the control device further comprises an injection timing determining unit which determines injection timing of the light oil or the mixed fuel containing light oil after the determination of the hydrogen addition concentration by the hydrogen addition quantity determining unit, by selecting appropriate data from the combustion data related to the hydrogen addition concentration so as to achieve high thermal efficiency based on the status of the internal combustion engine and the hydrogen addition concentration determined by the hydrogen addition quantity determining unit.

In the control device configured as above, after the hydrogen addition concentration is determined by the hydrogen addition quantity determining unit, injection timing of the light oil or the mixed fuel containing light oil is determined by the injection timing determining unit by selecting appropriate data from the combustion data related to the hydrogen addition concentration so as to achieve high thermal efficiency based on the status of the internal combustion engine and the hydrogen addition concentration determined by the hydrogen addition quantity determining unit. Therefore, the improvement of the thermal efficiency and the reduction of the generation rates of PM and $NO_X$ can be achieved more efficiently.

Preferably, the status of the internal combustion engine includes at least revolution speed of the internal combustion engine and required torque as torque that the internal combustion engine is required to output.

In the control device configured as above, the hydrogen addition concentration (representing a combustion waveform) improving the thermal efficiency of the internal combustion engine can be selected appropriately from the range of hydrogen addition concentrations suitable for PCCI combustion, depending on (based on) the status of the internal combustion engine including at least the revolution speed of the internal combustion engine and the required torque (torque that the internal combustion engine is required to output).

Further, the reduction of the $NO_X$ generation rate can be carried out depending on (based on) the status of the internal combustion engine including at least the revolution speed of the internal combustion engine and the required torque.

In accordance with another aspect of the present invention, there is provided a control device for an internal combustion engine using light oil or mixed fuel containing light oil as fuel and igniting the fuel in each combustion chamber by compressing the fuel, comprising: a fuel supply unit which supplies the fuel to each cylinder of the internal combustion engine; a gas supply unit which supplies premixed gas containing hydrogen to each cylinder of the internal combustion engine; a required torque calculating unit which calculates required torque, as torque that should be outputted by the internal combustion engine, based on an accelerator angle and revolution speed of the internal combustion engine; a fuel injection quantity calculating unit which calculates fuel injection quantity, as quantity of the fuel to be injected into each cylinder, based on the revolution speed of the internal combustion engine and the required torque calculated by the required torque calculating unit; a fuel supply control unit which controls injection timing and injection time of the fuel injected by the fuel supply unit into each cylinder based on PCCI (Premixed Charge Compression Ignition) combustion conditions of the internal combustion engine and the fuel injection quantity calculated by the fuel injection quantity calculating unit; a hydrogen addition concentration-related combustion data storage unit which stores combustion data related to hydrogen addition concentration previously obtained from multiple combustion waveforms changing depending on the hydrogen addition concentration, while using operational status information on the internal combustion engine, including at least the revolution speed of the internal combustion engine and the required torque calculated by the required torque calculating unit, as parameters; a hydrogen addition quantity determining unit which determines the quantity of the hydrogen to be supplied to each cylinder of the internal combustion engine by calculating a target hydrogen addition concentration achieving optimum thermal efficiency of the internal combustion engine by referring to the operational status information on the internal combustion engine and using the combustion data related to the hydrogen addition concentration stored in the hydrogen addition concentration-related combustion data storage unit; and a gas supply control unit which controls injection timing and injection time of the premixed gas injected by the gas supply unit into each cylinder based on the PCCI combustion conditions of the internal combustion engine and the quantity of the hydrogen to be supplied to each cylinder determined by the hydrogen addition quantity determining unit.

In the control device configured as above, the quantity of the hydrogen to be supplied to each cylinder of the internal combustion engine can be determined by calculating the target hydrogen addition concentration achieving the optimum thermal efficiency of the internal combustion engine by referring to the operational status information on the internal combustion engine (which includes at least the revolution speed of the internal combustion engine and the required torque, for example) and using the prestored combustion data related to the hydrogen addition concentration (with which the target hydrogen addition concentration achieving the optimum thermal efficiency can be calculated). The injection timing and the injection time of the premixed gas injected into each cylinder can be controlled based on the PCCI combustion conditions of the internal combustion engine and the quantity of the hydrogen to be supplied to each cylinder determined as above. Meanwhile, the fuel injection quantity (the quantity of the fuel to be injected into each cylinder) is calculated based on the revolution speed of the internal combustion engine and the required torque. The injection timing and the injection time of the fuel injected into each cylinder can be controlled based on the PCCI combustion conditions of the internal combustion engine and the fuel injection quantity calculated as above. Therefore, the PCCI (Premixed Charge Compression Ignition) combustion can be realized stably, while also improving the thermal efficiency of the internal combustion engine.

In accordance with another aspect of the present invention, there is provided a control device for an internal combustion engine using light oil or mixed fuel containing light oil as fuel and igniting the fuel in each combustion chamber by compressing the fuel, comprising: a fuel supply unit which supplies the fuel to each cylinder of the internal combustion engine; a gas generating unit which generates hydrogen or reformed gas containing hydrogen as premixed gas from the fuel; a gas supply unit which supplies the premixed gas to each cylinder of the internal combustion engine; a required torque calculating unit which calculates required torque, as torque that should be outputted by the internal combustion engine, based on an accelerator angle and revolution speed of the internal combustion engine; a fuel injection quantity calculating unit which calculates fuel injection quantity, as quantity of the fuel to be injected into each cylinder, based on the revolution speed of the internal combustion engine and the required torque calculated by the required torque calculating unit; a fuel supply control unit which controls injection timing and injection time of the fuel injected by the fuel supply unit into each cylinder based on PCCI (Premixed Charge Compression Ignition) combustion conditions of the internal combustion engine and the fuel injection quantity calculated by the fuel injection quantity calculating unit; a hydrogen addition concentration-related combustion data storage unit which stores combustion data related to hydrogen addition concentration previously obtained from multiple combustion waveforms changing depending on the hydrogen addition concentration, while using operational status information on the internal combustion engine, including at least the revolution speed of the internal combustion engine and the required torque calculated by the required torque calculating unit, as parameters; a hydrogen addition quantity determining unit which determines the quantity of the hydrogen to be supplied to each cylinder of the internal combustion engine by calculating a target hydrogen addition concentration achieving optimum thermal efficiency of the internal combustion engine by referring to the operational status information on the internal combustion engine and using the combustion data related to the hydrogen addition concentration stored in the hydrogen addition concentration-related combustion data storage unit; and a gas supply control unit which controls injection timing and injection time of the premixed gas injected by the gas supply unit into each cylinder based on the PCCI combustion conditions of the internal combustion engine and the quantity of the hydrogen to be supplied to each cylinder determined by the hydrogen addition quantity determining unit. The gas supply unit includes: a gas compressor which compresses the premixed gas generated by the gas generating unit; a pressure accumulator tank which stores the compressed premixed gas in a pressure-accumulated state; and gas injection valves each of which injects the premixed gas supplied from the pressure accumulator tank via each gas supply pipe branching into each cylinder of the internal combustion engine.

In the control device configured as above, the quantity of the hydrogen to be supplied to each cylinder of the internal combustion engine can be determined by calculating the target hydrogen addition concentration achieving the optimum thermal efficiency of the internal combustion engine by referring to the operational status information on the internal combustion engine (which includes at least the revolution speed of the internal combustion engine and the required torque, for example) and using the prestored combustion data related to the hydrogen addition concentration (with which the target hydrogen addition concentration achieving the optimum thermal efficiency can be calculated). The injection timing and the injection time of the premixed gas injected into each cylinder can be controlled based on the PCCI combustion conditions of the internal combustion engine and the quantity of the hydrogen to be supplied to each cylinder determined as above. Meanwhile, the fuel injection quantity (the quantity of the fuel to be injected into each cylinder) is calculated based on the revolution speed of the internal combustion engine and the required torque. The injection timing and the injection time of the fuel injected into each cylinder can be controlled based on the PCCI combustion conditions of the internal combustion engine and the fuel injection quantity calculated as above. Therefore, the PCCI (Premixed Charge Compression Ignition) combustion can be realized stably, while also improving the thermal efficiency of the internal combustion engine. Further, since the premixed gas (hydrogen or reformed gas containing hydrogen) is generated from the fuel (light oil or mixed fuel containing light oil), supply of the premixed gas to the internal combustion engine by use of a special source of the premixed gas becomes unnecessary, which is convenient and advantageous for the operation of the internal combustion engine.

Preferably, the control device further comprises an exhaust $NO_X$ concentration storage unit which stores exhaust $NO_X$ concentration data previously estimated corresponding to at least the operational status information on the internal combustion engine and the injection timing of the fuel. After the determination of the target hydrogen addition concentration achieving the optimum thermal efficiency of the internal combustion engine by the hydrogen addition quantity determining unit, the fuel supply control unit determines the injection timing of the fuel by referring to the operational status information on the internal combustion engine and using the exhaust $NO_X$ concentration data stored in the exhaust $NO_X$ concentration storage unit.

In the control device configured as above, the exhaust $NO_X$ concentration data previously estimated corresponding to at least the operational status information on the internal combustion engine and the injection timing of the fuel can be stored in the exhaust $NO_X$ concentration storage unit. After the determination of the target hydrogen addition concentration achieving the optimum thermal efficiency of the internal combustion engine, the injection timing of the fuel is determined by referring to the operational status information on the internal combustion engine and using the exhaust $NO_X$ concentration data stored in the exhaust $NO_X$ concentration storage unit Therefore, the generation (generation rate) of $NO_X$ can be reduced efficiently.

Preferably, the operational status information on the internal combustion engine includes at least the revolution speed of the internal combustion engine and the required torque.

In the control device configured as above, the target hydrogen addition concentration can be set at a value suitable for the PCCI combustion and capable of improving the thermal efficiency of the internal combustion engine, based on the operational status information on the internal combustion engine including at least the revolution speed of the internal combustion engine and the required torque.

Further, since the injection timing of the fuel can be determined based on the operational status information on the internal combustion engine including at least the revolution speed of the internal combustion engine and the required torque, the reduction of the $NO_X$ generation rate can be carried out efficiently based on the operational status information on the internal combustion engine including at least the revolution speed of the internal combustion engine and the required torque.

Other objects, features and advantages of the present invention will become more apparent from the consideration of the following detailed description taken in conjunction with the accompanying drawings.

according to this embodiment with the PCCI combustion possibility area according to a comparative example.

Figure 13:
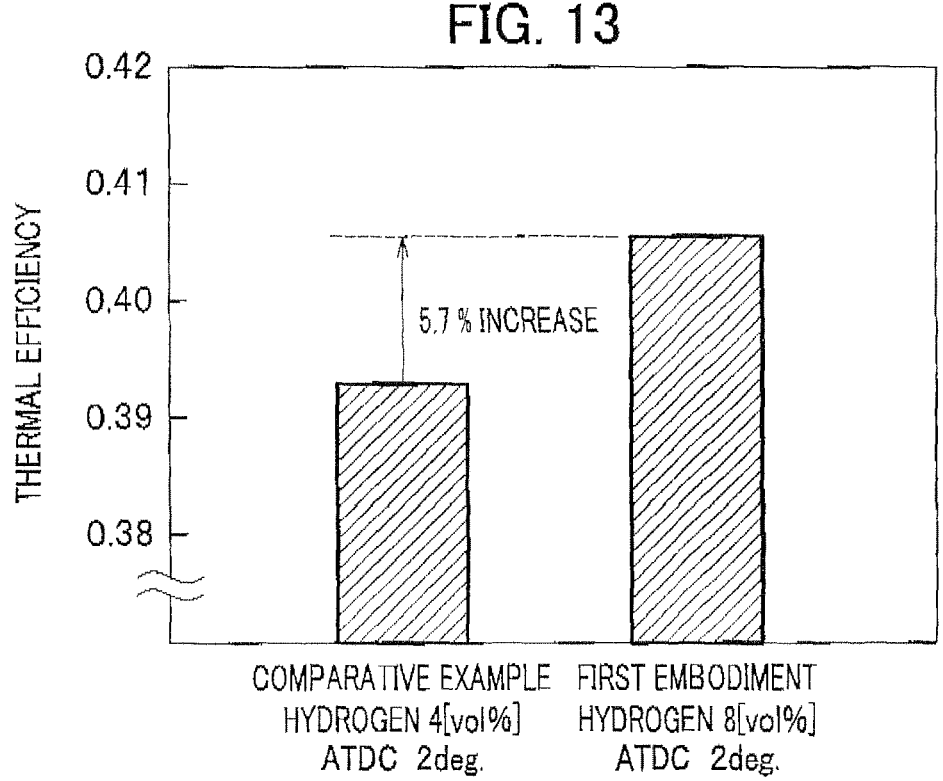

FIG. 13 is an explanatory drawing showing an example of improvement of the thermal efficiency by changing the hydrogen addition concentration.

Figure 14:
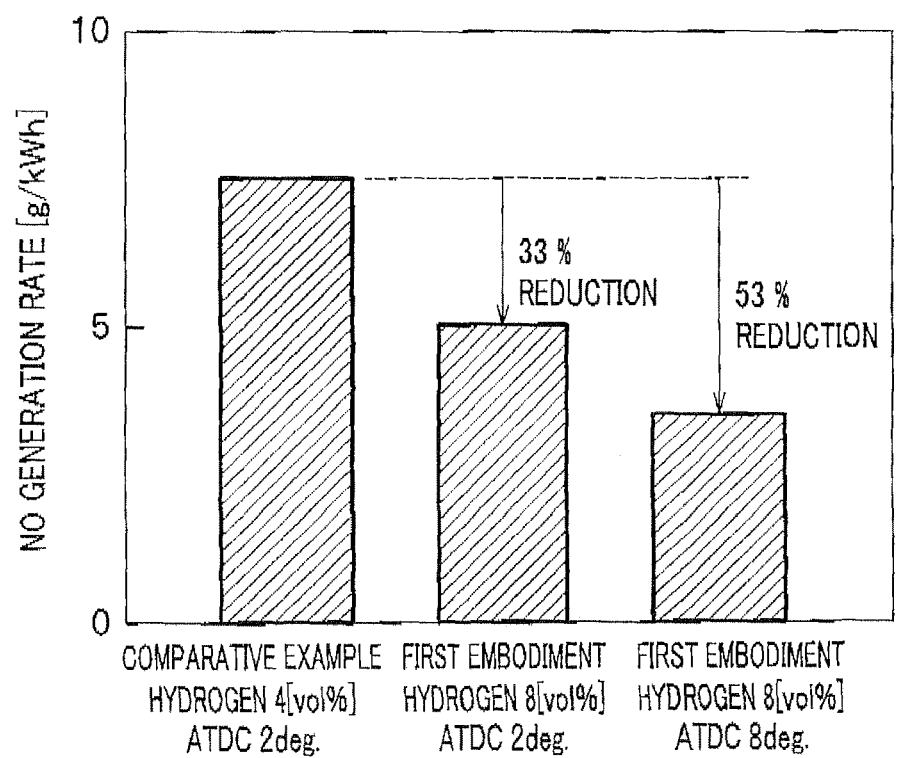

FIG. 14 is an explanatory drawing showing an example of reduction of the NO generation rate by optimizing the hydrogen addition concentration and the main fuel injection timing.

Figure 15:
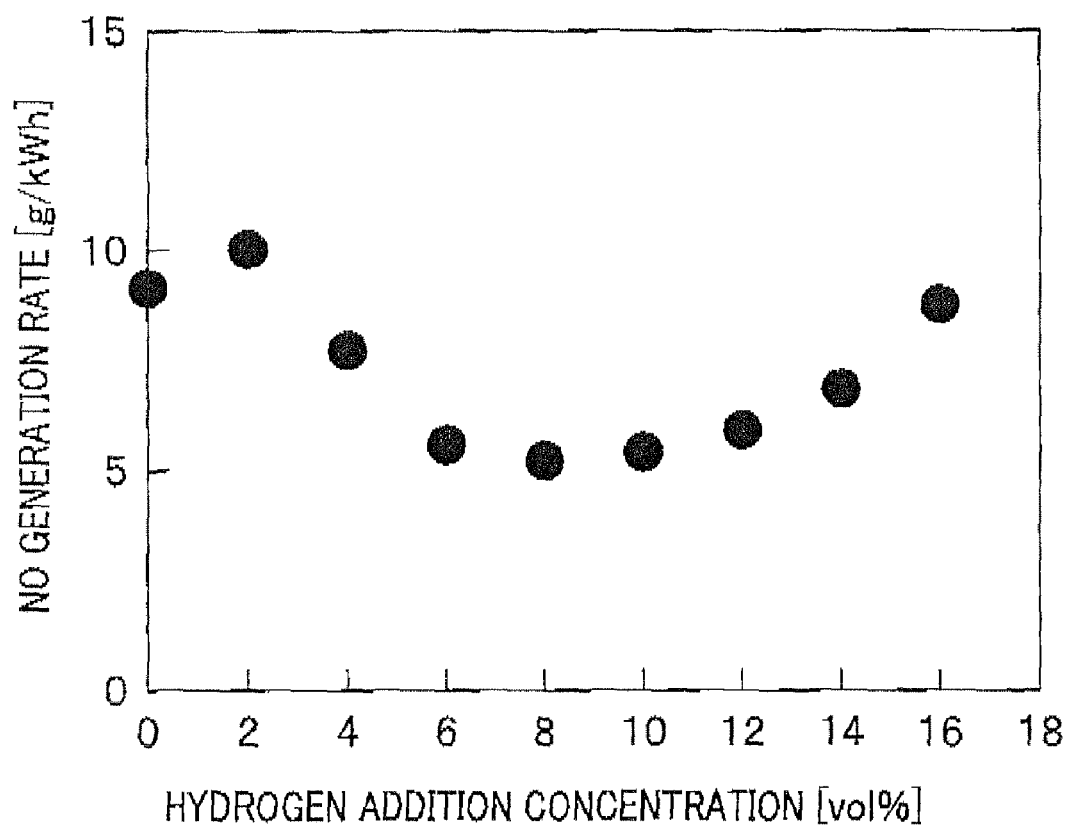

FIG. 15 is a graph showing the relationship between the hydrogen addition concentration and the NO generation rate in the first embodiment.

Figure 16A:
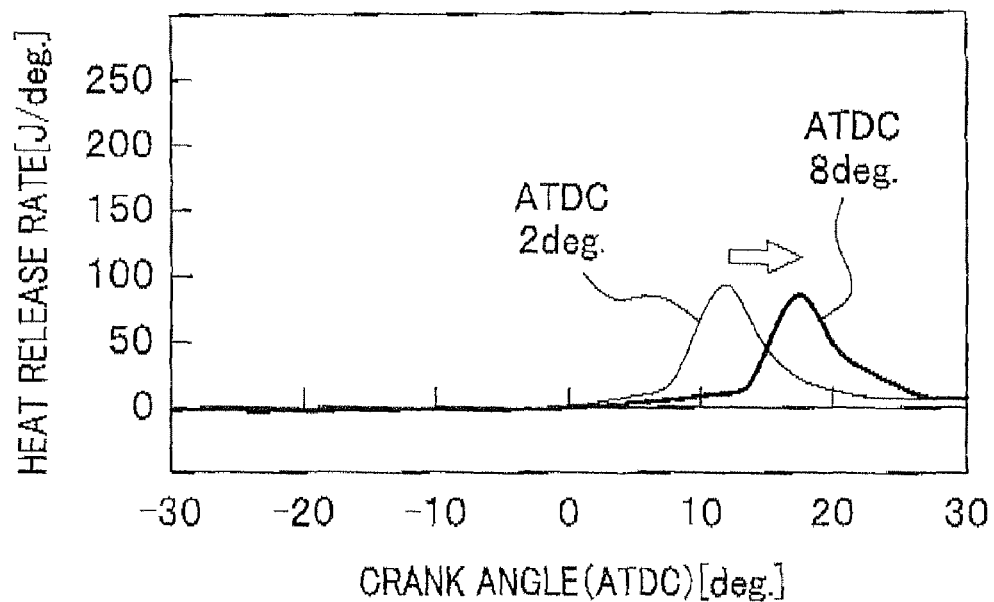

FIG. 16A is a graph comparing two combustion waveforms obtained by changing the fuel injection timing.

Figure 16B:
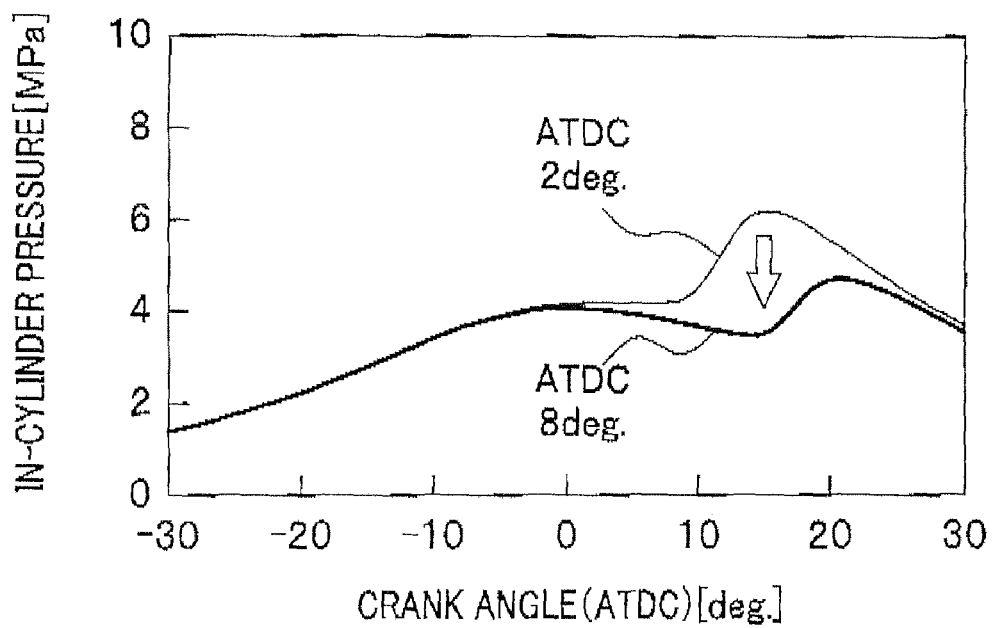

FIG. 16B is a graph showing an example of a change in the in-cylinder pressure caused by a change in the fuel injection timing corresponding to FIG. 16A.

Figure 17:
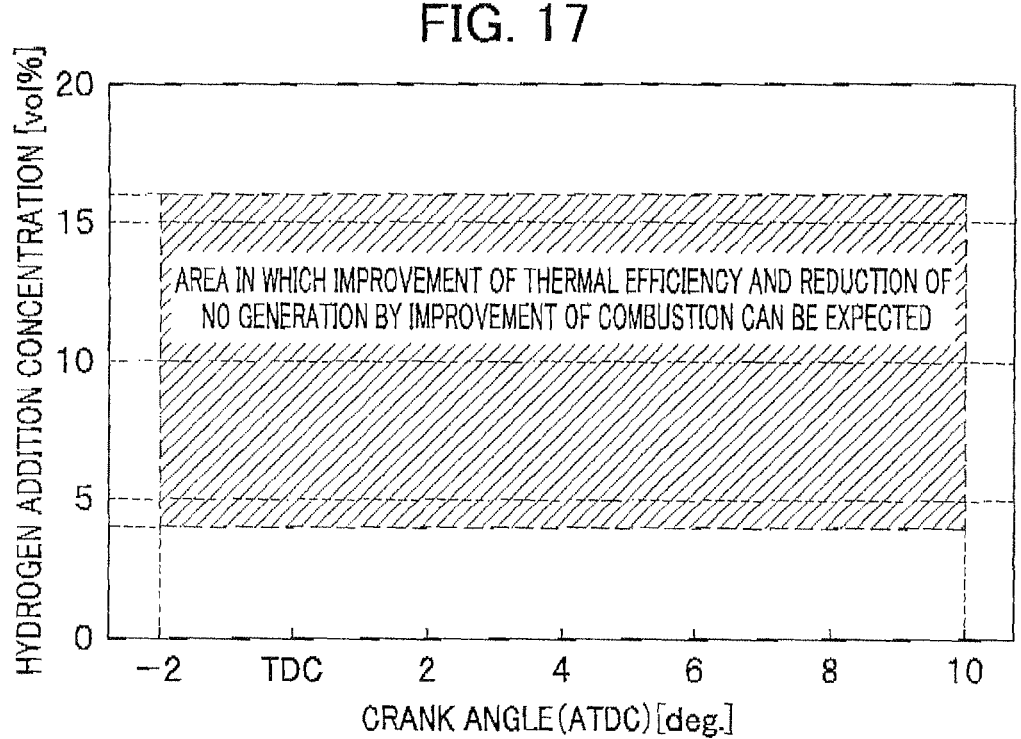

FIG. 17 is a graph showing an area (regarding the main fuel injection timing and the hydrogen addition concentration) in which the improvement of thermal efficiency and the reduction of NO generation by the improvement of PCCI combustion can be expected.

Figure 18:
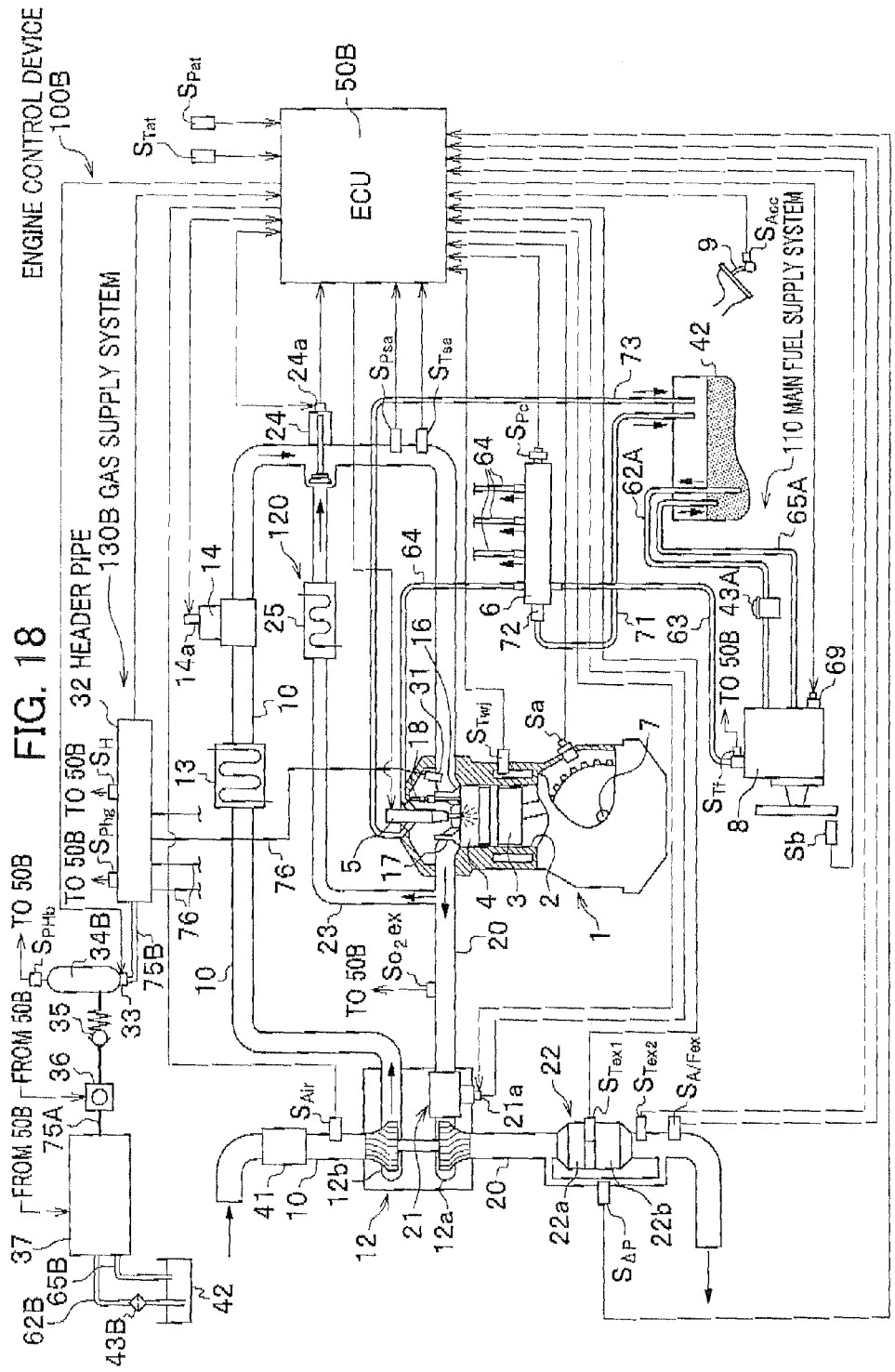

FIG. 18 is a schematic functional block diagram of an engine control device in accordance with a second embodiment of the present invention.

Figure 19:
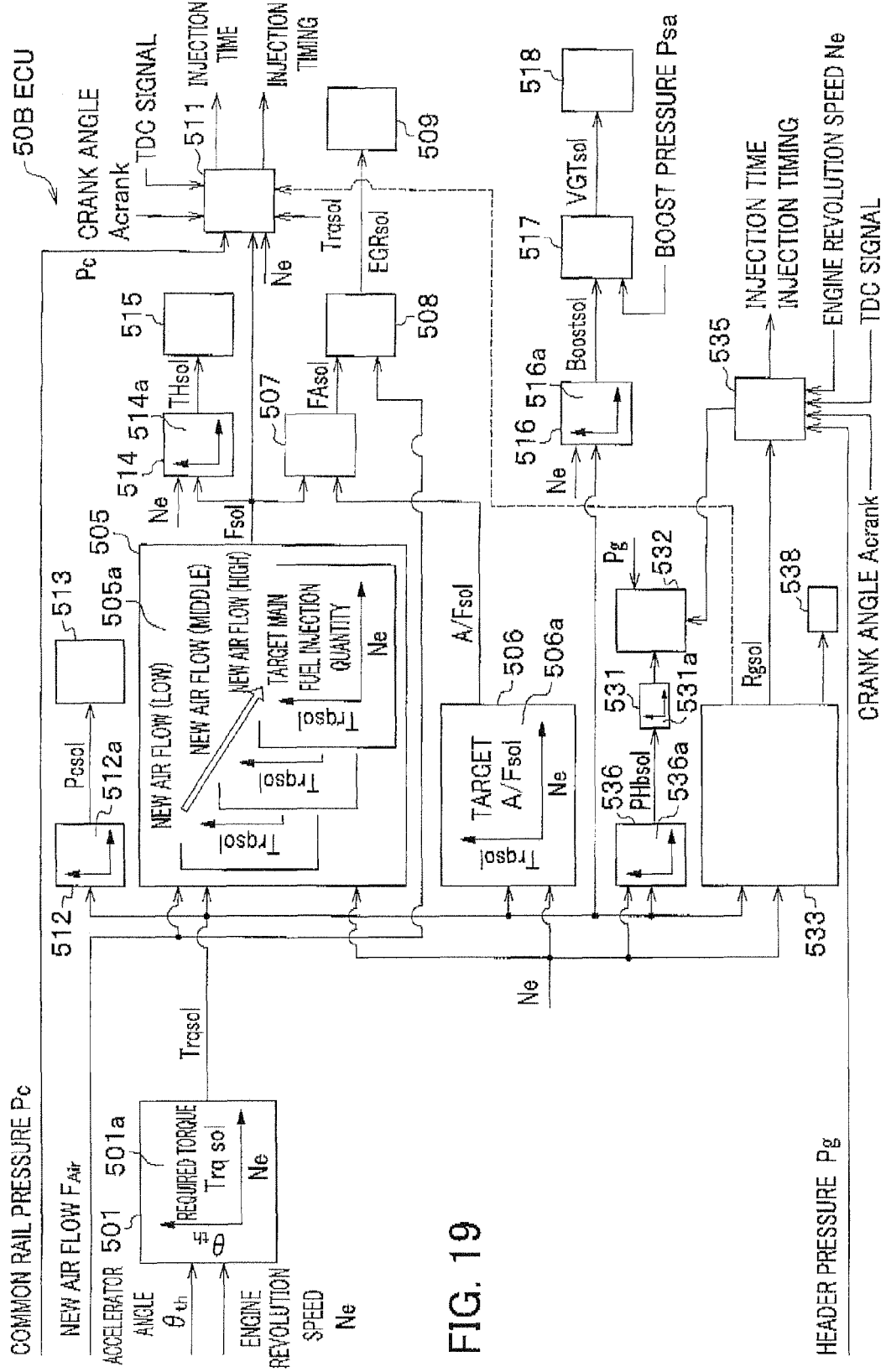

FIG. 19 is a functional block diagram of an engine electronic control unit which is employed for the engine control device of the second embodiment.

Figure 20:
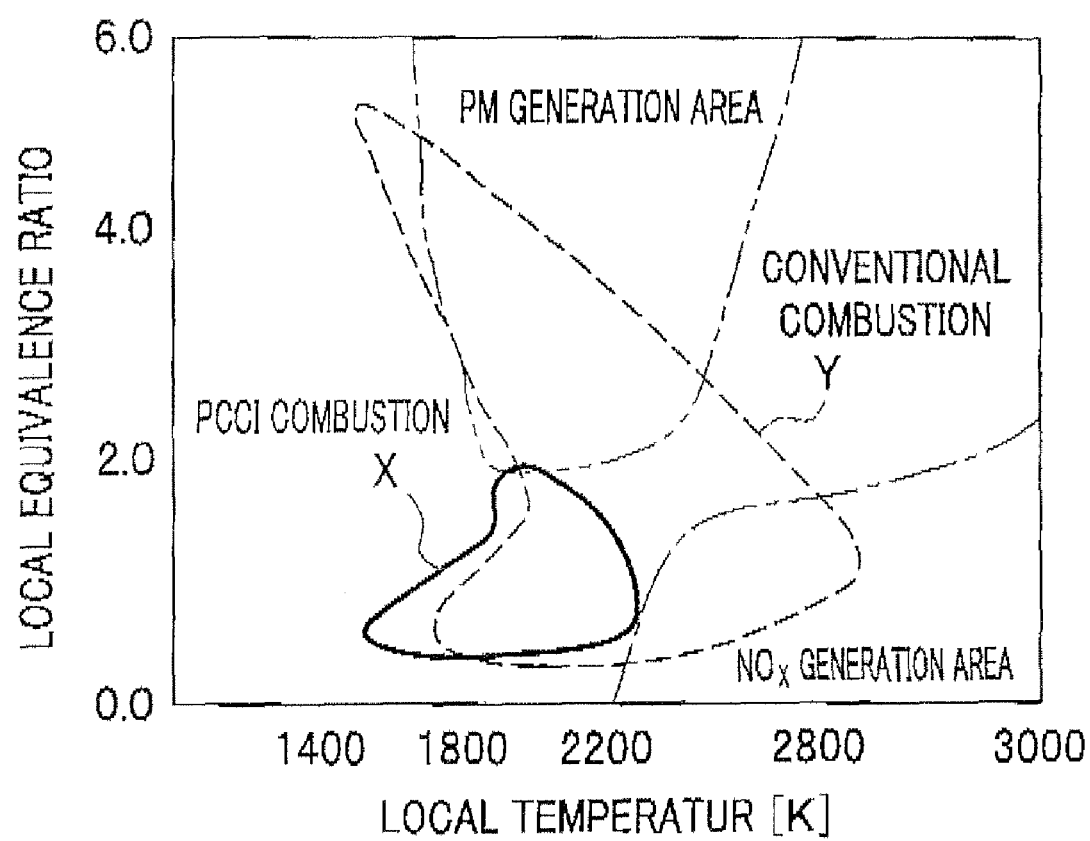

FIG. 20 is a graph showing a PM generation area and a NOx generation area in regard to local temperature and local equivalence ratio.

DETAILED DESCRIPTION OF THE EMBODIMENTS

Referring now to the drawings, a description will be given in detail of preferred embodiments in accordance with the present invention.

First Embodiment

The outline of an engine control device (control device for an internal combustion engine) in accordance with a first embodiment of the present invention will be described below with reference to FIGS. 1-4.

Figure 1:
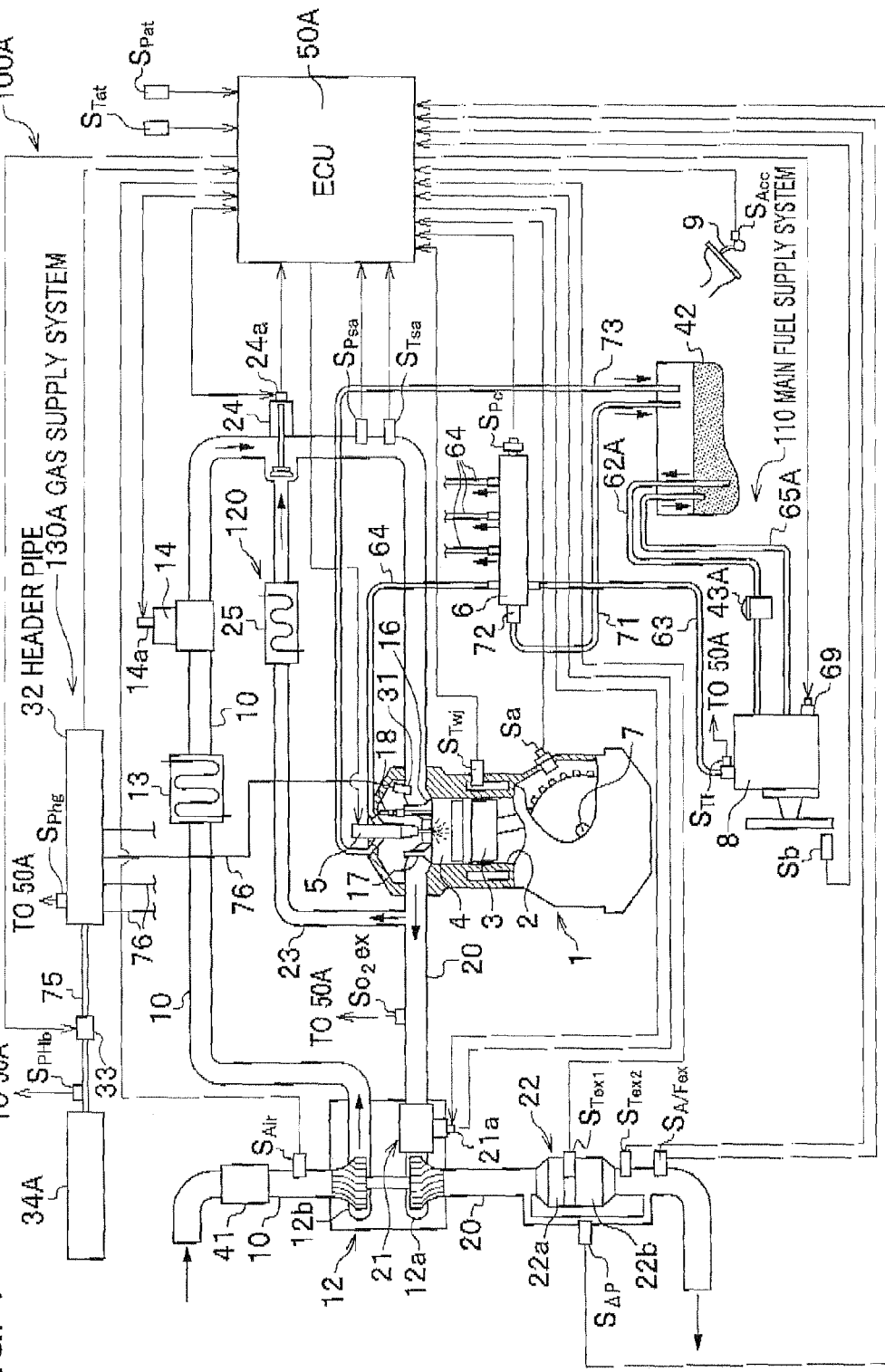
FIG. 1 is a schematic functional block diagram of an engine control device in accordance with a first embodiment of the present invention.
Figure 2:
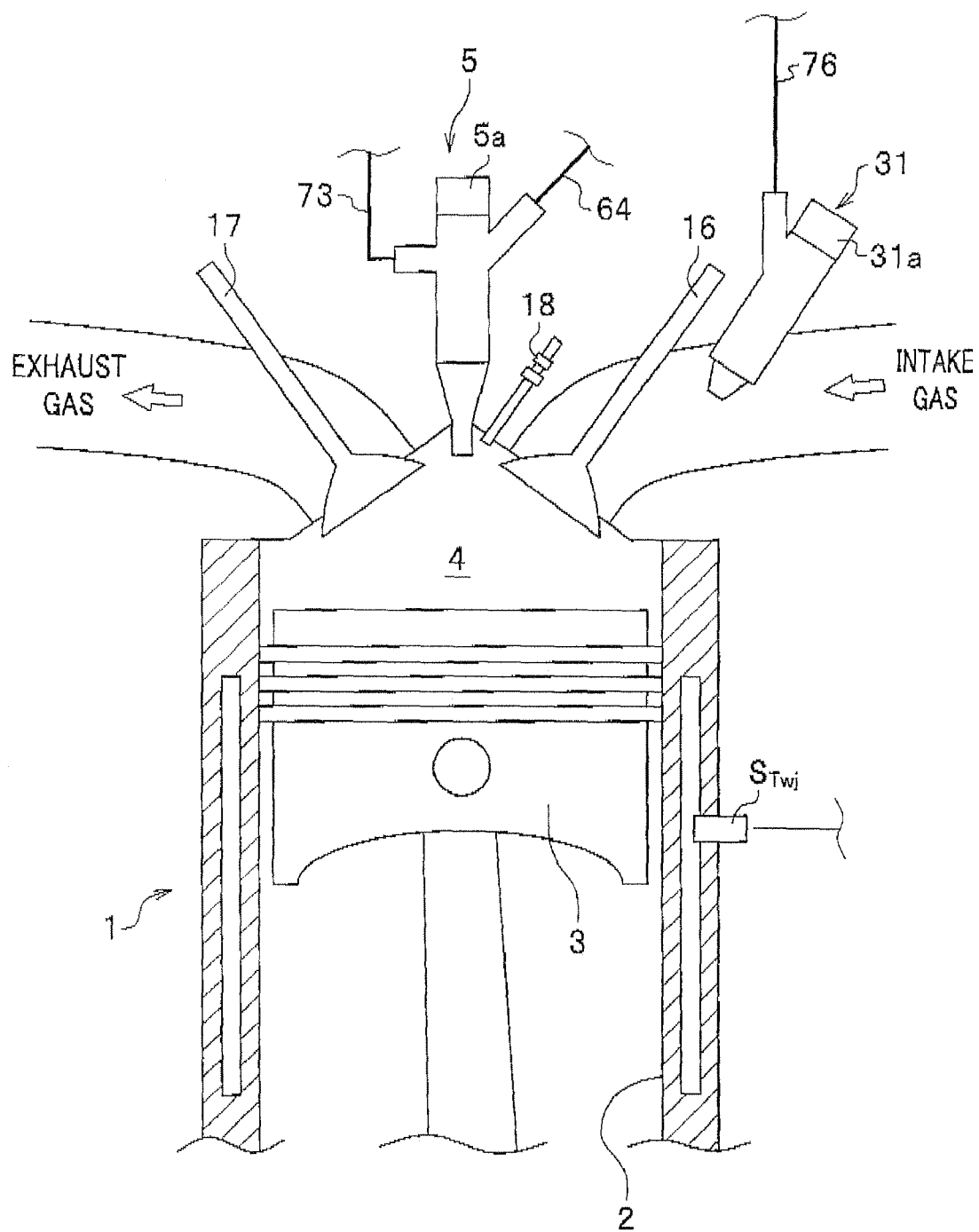
FIG. 2 is an enlarged view of a cylinder head of an engine shown in FIG. 1.
Figure 3:
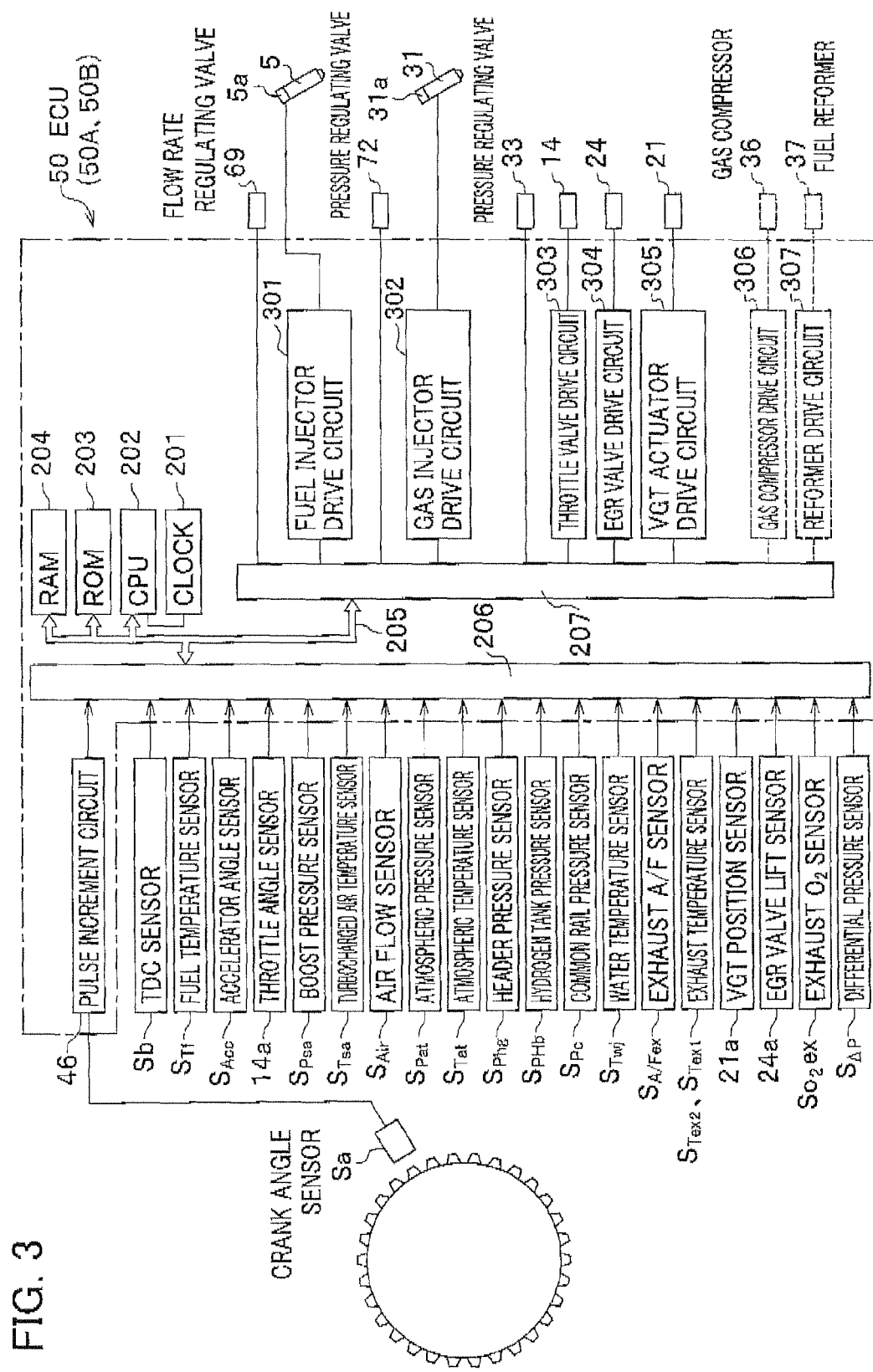
FIG. 3 is a schematic block diagram for explaining the hardware configuration of an engine electronic control unit which is employed for the engine control device.
Figure 4:
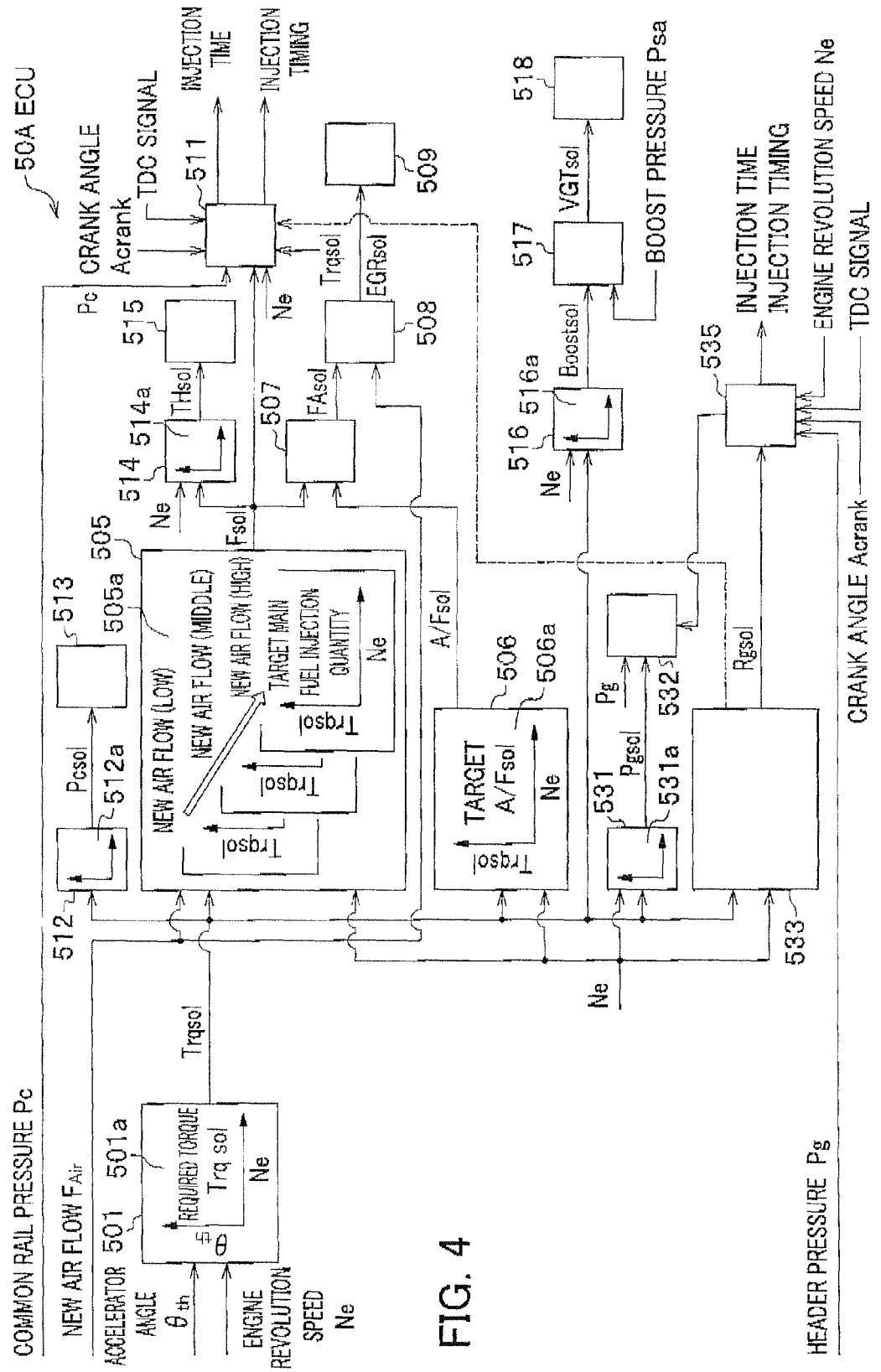
FIG. 4 is a functional block diagram of the engine electronic control unit in the first embodiment.

FIG. 1 is a schematic functional block diagram of the engine control device in accordance with the first embodiment. FIG. 2 is an enlarged view of a cylinder head of an engine 1 shown in FIG. 1. FIG. 3 is a schematic block diagram for explaining the hardware configuration of an engine electronic control unit which is employed for the engine control device. FIG. 4 is a functional block diagram of the engine electronic control unit.

The engine 1 (internal combustion engine) shown in FIGS. 1 and 2 is a diesel engine, in which air taken into a combustion chamber 4 formed in each cylinder 2 (intake air) is compressed by a piston 3 into a high-temperature state and self ignition is caused by injecting fuel into the compressed high-temperature intake air in the combustion chamber 4. Specifically, the engine 1 is a four-stroke diesel engine in which each cylinder head is equipped with an intake valve 16 and an exhaust valve 17.

While the engine 1 has multiple cylinders 2, only one of the cylinders 2 is shown in FIGS. 1 and 2 as a representative.

As shown in FIG. 1, the engine control device 100A (control device for an internal combustion engine) for controlling the engine 1 includes a main fuel supply system 110 (fuel supply unit) for supplying main fuel (fuel) to the engine 1, an exhaust gas reflux system 120 for returning part of exhaust gas to the engine 1, and a gas supply system 130A (gas supply unit) for regulating (reducing) the pressure of gas (containing hydrogen) supplied from a hydrogen tank 34A and supplying the decompressed gas to the engine 1 as premixed gas.

The main fuel supply system 110 mainly includes fuel injectors 5, a common rail 6, a high-pressure supply pump 8, a fuel tank 42, a fuel filter 43A, pipes 62A, 63, 64, 65A, 71 and 73 for connecting the components, sensors $S_{Pc}$ and $S_{Tf}$, a flow rate regulating valve (flow control valve) 69 and a pressure regulating valve 72.

The exhaust gas reflux system 120 includes an exhaust gas reflux path (hereinafter referred to as an "EGR path") 23, an exhaust gas reflux flow rate regulating valve (hereinafter referred to as an "EGR valve") 24 and an EGR cooler 25.

The gas supply system 130A mainly includes gas injectors (gas injection valves) 31, a header pipe 32, a pressure regulating valve 33, the hydrogen tank 34A, pipes 75 and 76 for connecting the components, and sensors $S_{PHb}$ and $S_{Phg}$.

(Main Fuel Supply System)

First, the main fuel supply system 110 will be explained below.

In each cylinder 2 of the engine 1 (see FIG. 2), the fuel injector 5 (having an injecting hate at its tip) is provided substantially at the center of the top of the combustion chamber 4 with the injecting hole facing the combustion chamber 4. The fuel injector 5, which is opened and closed according to predetermined injection timing for each cylinder 2, injects the main fuel directly into the combustion chamber 4.

To each fuel injector 5, the pipe (high-pressure fuel supply pipe) 64, branching off from the common rail 6 storing high-pressure fuel, is connected. The common rail 6 is equipped with the sensor (common rail pressure sensor) $S_{Pc}$ for detecting the fuel pressure Pc in the common rail 6 (hereinafter referred to also as "common rail pressure Pc") and the pressure regulating valve 72 for regulating the fuel pressure Pc by returning the main fuel to the fuel tank 42 via the pipe (return pipe) 71 when the detected common rail pressure Pc is higher than a target common rail pressure. To the common rail 6, the pipe (discharge pipe) 63 extending from the discharging outlet of the high-pressure supply pump 8 (driven by a crankshaft 7) is connected.

Incidentally, the fuel injector 5 shown in FIG. 1 is an injector of the back-pressure type. When an actuator 5a (see FIG. 2) of the fuel injector 5 is driven, part of the main fuel in the fuel injector 5 is returned to the fuel tank 42 via the pipe (return pipe) 73 for the main fuel injecting action of the injector. In cases where the fuel injector 5 is a direct-acting injector, the return pipe 73 is unnecessary.

The high-pressure supply pump 8 works in cooperation with the pressure regulating valve 72 so as to maintain the common rail pressure Pc (fuel pressure Pc in the common rail 6) detected by the common rail pressure sensor $S_{Pc}$ at a value (e.g., 30 MPa-200 MPa depending on the operational status of the engine 1) that is determined from engine revolution speed Ne (operational status information on the internal combustion engine) and requested torque Trqsol (operational status information on the internal combustion engine).

The discharging outlet of the high-pressure supply pump 8 is equipped with the sensor (fuel temperature sensor) $S_{Tf}$ for detecting the temperature of the main fuel.

The engine 1 is equipped with a crank angle sensor Sa for detecting the rotational angle of the crankshaft 7. The crank angle sensor Sa, having an electromagnetic pickup placed to face the circumference of an object plate (unshown) attached to the end of the crankshaft 7, outputs pulse signals corresponding to the passage of protrusions formed along the whole circumference of the object plate (see FIG. 3). The engine 1 is further equipped with a TDC (Top Dead Center) sensor Sb which sends a TDC signal (as a cylinder discrimination signal to be used for discriminating among the cylinders 2) to an engine electronic control unit 50A (hereinafter referred to as an "ECU 50A") (combustion control unit).
(Intake System)

Next, the configuration of the intake system of the engine 1 will be explained below.

The intake air (air) after being filtered by an air cleaner 41 flows through an intake path 10, branches out via a surge tank (unshown) into paths corresponding to the cylinders 2, and is introduced into the combustion chamber 4 of each cylinder 2 via an intake port. The intake path 10 is provided with (from the upstream end toward the downstream end) the aforementioned air cleaner 41, an air flow sensor $S_{Air}$ for detecting the flow rate of the intake air taken into the engine 1, a compressor 12b of a turbocharger 12 for compressing the intake air, an inter-cooler 13 for cooling the intake air which has heated up due to the compression, a throttle valve 14 for throttling (reducing the cross-sectional area of) the intake path 10, a boost pressure sensor $S_{Psa}$ (placed in the surge tank) for detecting the boost pressure supplied to each cylinder 2, and a turbocharged air temperature sensor $S_{Tsa}$ for detecting the temperature of the intake air in the surge tank.

Further, an atmospheric pressure sensor $S_{Pat}$ and an atmospheric temperature sensor $S_{Tat}$ are provided for detecting the atmospheric pressure and the atmospheric temperature. Signals from the sensors are inputted to the ECU 50A.

The throttle valve 14 (e.g., butterfly valve) has a valve body with a notch so that the intake air can flow through the valve even when the valve is totally closed. The open angle of the throttle valve 14 (employing a drive mechanism such as a solenoid valve and having a throttle angle sensor 14a for detecting the open angle) is controlled by the ECU 50A.

The air flow sensor $S_{Air}$ is of a type capable of reliably detecting the air flow rate even when the flow velocity varies (e.g., constant-temperature hot film air flow sensor described in Paragraph [0029] of Japanese Laid-open Patent Publication No. 2000-104628). Based on the output (measurement value) of the air flow sensor $S_{Air}$, air flow rate exclusively in the normal direction can be measured, by which the control of the exhaust gas reflux flow rate is prevented from being affected by errors deriving from the backward flow.
(Exhaust System)

In FIG. 1, the upstream end of an exhaust path 20 (which is used for discharging the exhaust gas from the combustion chambers 4 of the cylinders 2) branches out corresponding to the cylinders 2 and each of the branched paths connects to the combustion chamber 4 of each cylinder 2 via an exhaust port (unshown). The exhaust path 20 is provided with (from the upstream end toward the downstream end) an exhaust $O_2$ sensor $S_{O2ex}$ for detecting the oxygen concentration in the exhaust gas, a turbine 12a which is rotated by the exhaust gas stream, and a catalytic converter 22 capable of removing HC, CO, NOx and particulate matter from the exhaust gas.

The catalytic converter 22 includes an oxidation catalyst unit 22a and a DPF (Diesel Particulate Filter) 22b. The catalytic converter 22 is equipped with a differential pressure sensor $S\Delta_P$ for detecting the differential pressure between the inlet and outlet of the catalytic converter 22, an exhaust temperature sensor $S_{Tex1}$ for detecting the exhaust temperature at the outlet of the oxidation catalyst unit 22a, and an exhaust temperature sensor $S_{Tex2}$ for detecting the exhaust temperature at the outlet of the DPF 22b. Further, an exhaust A/F sensor $S_{A/Fcx}$ for detecting the air-fuel ratio in the exhaust gas is placed downstream of the catalytic converter 22.

The turbocharger 12 including the turbine 12a and the compressor 12b is implemented by, for example, a VGT (Variable Geometry Turbocharger), in which a plurality of vanes (unshown) are placed in a turbine chamber (housing the turbine 12a) to surround the circumference of the turbine 12a and each of the vanes rotates so as to change the nozzle cross-sectional area of the exhaust path.

Thus, the turbocharger 12 is equipped with a VGT actuator 21 for rotating the movable vanes and a VGT position sensor 21a for detecting the rotational position (angle) of the movable vanes. The rotational position of the movable vanes is feedback-controlled by the ECU 50A by detecting the difference between the actual position (detected angle) and a target position (target angle) of the movable vanes.
(Exhaust Gas Reflux System)

The EGR path 23 (for returning part of the exhaust gas to the intake side of the engine 1) branches off from a part of the exhaust path 20 upstream of the turbine 12a. The downstream end of the EGR path 23 is connected to a part of the intake path 10 downstream of the throttle valve 14. The EGR valve 24, whose open angle is adjustable, is placed nearby the downstream end of the EGR path 23. Part of the exhaust gas from the engine 1 is drawn from the exhaust path 20 into the EGR path 23 by use of differential pressure between the pressure in the exhaust path 20 which is on the upstream side relative to the exhaust gas flowing through the EGR path 23 (exhaust-side pressure) and the pressure in the intake path 10 which is on the downstream side relative to the exhaust gas flowing through the EGR path 23 (intake-side pressure). The flow rate of the exhaust gas drawn into the EGR path 23 and returned to the intake path 10 is controlled by use of the EGR valve 24.

The EGR valve 24 is implemented by, for example, a linear solenoid valve having an EGR valve lift sensor 24a at the head of the solenoid. The open angle of the EGR valve 24 is feedback-controlled by the ECU 50A by detecting the difference between the actual angle and a target angle of the EGR valve 24.

The aforementioned fuel injector 5, throttle valve 14, EGR valve 24, VGT actuator 21, etc. operate according to control signals from the ECU 50A. To the ECU 50A, signals from the boost pressure sensor $S_{Psa}$, the turbocharged air temperature sensor $S_{Tsa}$, the crank angle sensor Sa, the air flow sensor $S_{Air}$, the exhaust $O_2$ sensor $S_{O2ex}$, the EGR valve lift sensor 24a, an accelerator angle sensor $S_{Acc}$ (for detecting the degree of depressing the accelerator pedal 9 by the driver of the vehicle (accelerator angle)), etc. are inputted.

A signal from a water temperature sensor $S_{Twj}$ (for detecting the temperature of cooling water for cooling the cylinders 2) is also inputted to the ECU 50A.
(Gas Supply System)

Next, the gas supply system 130A will be explained below.

The intake port of each cylinder 2 is provided with the gas injector 31 (see FIG. 2). The gas injector 31 (having an injection hole at its tip) is opened and closed with injection timing prescribed for each cylinder 2 so as to inject the premixed gas (gas containing hydrogen) from the injection hole facing the intake valve 16.

Gas supply pipes 76 branching out from the common header pipe 32 are connected to the gas injectors 31, respectively. The header pipe 32 is provided with a header pressure sensor $S_{Phg}$ for detecting the gas pressure $P_g$ in the header pipe 32 (hereinafter referred to as "header pressure $P_g$"). To the header pipe 32, the pipe (gas supply main pipe) 75 for supplying the premixed gas from the hydrogen tank 34A via the pressure regulating valve 33 is connected. The gas supply main pipe 75 is provided with a hydrogen tank pressure sensor $S_{PHb}$ for detecting the pressure of the hydrogen tank 34A.

The pressure regulating valve 33 regulates the header pressure $P_g$ under the control of the ECU 50A.

The pressure regulating valve 33 decompresses the premixed gas from the hydrogen tank pressure PHb and then supplies the decompressed premixed gas to the gas injectors 31 via the header pipe 32. The header pipe 32 serves to moderate pressure fluctuation in the cylinders 2 caused by the gas injection by the gas injectors 31. The total capacity of the header pipe 32 and the gas supply pipes 76 (extending to the gas injectors 31 of the cylinders 2) approximately equals the maximum volume of the premixed gas injected into all the cylinders 2 of the engine 1 (one injection per cylinder 2). In a four-cylinder engine, for example, the total capacity approximately equals the maximum volume of the premixed gas injected in four injections.

Even a direct-acting injector is usable as the gas injector 31 since the injection pressure of the gas injector 31 may be set relatively low. The actuator 31a (see FIG. 2) of the gas injector 31 is a solenoid actuator or a piezoelectric actuator, for example.

Incidentally, the reference numeral "18" in FIGS. 1 and 2 represents a glow plug.

(Overall Configuration of Control System)

Next, the ECU 50A employed for the engine control device (control device for an internal combustion engine) 100A of this embodiment will be explained below referring to FIG. 3 (and FIG. 4 as needed).

As shown in FIG. 3, the ECU 50A (formed of a microcomputer and peripheral electric circuits) includes a clock 201 having a calendar/clock function, a CPU (Central Processing Unit) 202 having a control function and a calculation function, a ROM (Read Only Memory) 203 storing programs, a RAM (Random Access Memory) 204 for temporarily storing data, etc. during program execution, an input interface 206, an output interface 207, and a bus 205 connecting the CPU 202, ROM 203, RAM 204, input interface 206, output interface 207, etc. together.

To the input interface 206, signals from various sensors are inputted.

The pulse signals from the crank angle sensor Sa are processed by a pulse increment circuit 46 into a signal corresponding to a certain crank angle (hereinafter referred to as a "crank angle Acrank"). The signal representing the crank angle Acrank is inputted to the CPU 202 via the input interface 206 together with the TDC signal from the TDC sensor Sb.

As shown in FIG. 3, the signals from the pulse increment circuit 46 and the TDC sensor Sb are inputted to the CPU 202 via the input interface 206 as the signal representing the crank angle Acrank and the TDC signal (indicating which of the cylinders 2 has entered the combustion and expansion stroke), respectively.

Incidentally, the engine revolution speed Ne is calculated by the CPU 202 from the signal representing the crank angle Acrank and is used in the functional block diagram of FIG. 4.

Further, as shown in FIG. 3, the signal from the accelerator angle sensor $S_{Acc}$ (representing the accelerator angle $\theta_{th}$), the signal from the throttle angle sensor 14a, the signal from the boost pressure sensor $S_{Psa}$ (representing the boost pressure Psa), the signal from the turbocharged air temperature sensor $S_{Tsa}$ (representing the intake air temperature Tsa), the signal from the air flow sensor $S_{Air}$ (representing the new air flow FAir, that is, the flow rate of the intake air taken into the engine 1), the signal from the atmospheric pressure sensor $S_{Pat}$ (representing the atmospheric pressure Pat), the signal from the atmospheric temperature sensor $S_{Tat}$ (representing the atmospheric temperature Tat), etc. are inputted as signals relating to the intake system.

Incidentally, the new air flow FAir (at the atmospheric pressure Pat and the atmospheric temperature Tat) is used for conversion calculation into (standard) new air flow FAir under standard conditions (standard atmospheric pressure, standard temperature).

As signals relating to the main fuel supply system 110, the signal from the fuel temperature sensor $S_{Tf}$ (representing the fuel temperature Tf) and the signal from the common rail pressure sensor $S_{Pc}$ (representing the common rail pressure Pc) are inputted as shown in FIG. 3. The fuel temperature Tf is used when a PCCI combustion main fuel injection control unit 511 (see FIG. 4, explained later) sets main fuel injection quantity. The PCCI combustion main fuel injection control unit 511 sets a main fuel injection time (which is proportional to the main fuel injection quantity) considering density variation of the main fuel which is dependent on the fuel temperature Tf.

As a signal relating to the exhaust gas reflux system 120, the signal from the EGR valve lift sensor 24a (representing the lift) of the EGR valve 24) is inputted as shown in FIG. 3.

As signals relating to the gas supply system 130A, the signal from the hydrogen tank pressure sensor $S_{PHb}$ (representing the pressure PHb of the hydrogen tank 34A) and the signal from the header pressure sensor $S_{Phg}$ (representing the header pressure $P_g$) are inputted as shown in FIG. 3.

As signals relating to the exhaust system, the signal from the exhaust $O_2$ sensor $S_{O2ex}$ (representing the exhaust oxygen concentration), the signal from the VGT position sensor 21a (representing the rotational position of the vanes), the signals from the exhaust temperature sensors $S_{Tex1}$ and $S_{Tex2}$ (see FIG. 1) of the catalytic converter 22 (representing the exhaust temperatures Tex1 and Tex2), the signal from the exhaust A/F sensor $S_{A/Fex}$ (representing the air-fuel ratio in the exhaust gas after passing through the catalytic converter 22), and the signal from the differential pressure sensor $S\Delta_P$ (representing the differential pressure $\Delta P$ between the inlet and outlet of the catalytic converter 22) are inputted as shown in FIG. 3.

Incidentally, the signals representing the exhaust temperatures Tex1 and Tex2, the air-fuel ratio in the exhaust gas and the differential pressure $\Delta P$ (which are used mainly for the monitoring/control of the exhaust purification function of the catalytic converter 22) are irrelevant to the key features of the present invention.

The signal from the water temperature sensor $S_{Twj}$ (representing the temperature Twj of the cooling water) is also inputted as mentioned above. This signal is used for temperature control of the EGR cooler 25 of the exhaust gas reflux system 120 just after startup of the engine 1, temperature control of the inter-cooler 13, etc.

As shown in FIG. 3, the CPU 202 outputs a variety of control signals to various drive circuits, valves, etc. via the aforementioned output interface 207.

The control signals outputted by the CPU 202 include a control signal to the flow rate regulating valve 69 (which controls the inflow of the main fuel into the high-pressure supply pump 8), a control signal to a fuel injector drive circuit 301 (which controls the actuator 5a of the fuel injector 5), a control signal to the pressure regulating valve 72 of the common rail 6, a control signal to a gas injector drive circuit 302 (which controls the actuator 31a of the gas injector 31 (see FIG. 2)), a control signal to the pressure regulating valve 33 of the header pipe 32, a control signal to a throttle valve drive circuit 303 (which controls the throttle valve 14), a control signal to an EGR valve drive circuit 304 (which controls the EGR valve 24), a control signal to a VGT actuator drive circuit 305 (which drives and controls the VGT actuator 21), etc.

Incidentally, functional blocks in FIG. 3 represented by broken-line frames are additional components employed in a second embodiment of the present invention. Details of the additional components will be explained in the second embodiment.

<<Explanation of Engine Control>>

Next, the engine control executed by the ECU 50A will be explained below referring to FIG. 4 (and FIG. 3, FIG. 5, FIG. 6 and FIG. 7 as needed).

(Outline of Control)

The outline of basic processes of the engine control executed by the ECU 50A are shown in the functional block diagram of FIG. 4. The ECU 50A controls the air-fuel ratio of each cylinder 2 with high uniformity and high accuracy, by calculating required torque Trqsol based on the accelerator angle $\theta_{th}$ and the engine revolution speed Ne (required torque calculating unit), determining basic parameters (injection quantity and injection timing of the main fuel and injection quantity of the premixed gas (hydrogen addition concentration)) and adjusting an EGR ratio by operating the EGR valve 24. The "EGR ratio" means the ratio of the amount of the refluxed (returned) exhaust gas (EGR quantity) to the amount of the whole exhaust gas (EGR ratio=EGR quantity/total exhaust gas quantity).

Specifically, a two-dimensional map 501a (storing optimum values of the required torque Trqsol experimentally determined for changes in (i.e., for multiple values of ditto for the following explanation of other maps, etc.) the accelerator angle $\theta_{th}$ and the engine revolution speed Ne), a three-dimensional map 505a (storing optimum values of target main fuel injection quantity (Fsol) experimentally determined for changes in the engine revolution speed Ne, the required torque Trqsol and the new air flow FAir (i.e., flow rate of the intake air not including the main fuel or the premixed gas, ditto for the following description), and a two-dimensional map 506a (storing optimum values of target air-fuel ratio (A/Fsol) experimentally determined for changes in the engine revolution speed Ne and the required torque Trqsol) have been electronically stored in the ROM 203 (see FIG. 3) of the ECU 50A.

Also electronically stored in the ROM 203 are a two-dimensional map 514a (storing optimum values of intake air throttling level (THsol) experimentally determined for changes in the engine revolution speed Ne and the target main fuel injection quantity Fsol), a two-dimensional map 512a regarding the common rail pressure Pc (storing optimum values of the common rail pressure Pc (Pcsol) experimentally determined for changes in the engine revolution speed Ne and the required torque Trqsol), a two-dimensional map 516a (storing optimum values of target boost pressure (Boostsol) experimentally determined for changes in the engine revolution speed Ne and the required torque Trqsol), a two-dimensional map 531a regarding the header pressure $P_g$ (storing optimum values of the header pressure $P_g$ (Pgsol) experimentally determined for changes in the engine revolution speed Ne and the required torque Trqsol), a map 600 (see FIG. 5) to be used far determining the main fuel injection time corresponding to (suitable for) the common rail pressure Pc and the target main fuel injection quantity Fsol, a main fuel injection timing Fi table 601 (see FIGS. 5 and 6) to be used for determining the main fuel injection timing (represented by the crank angle in FIG. 5) suitable for reducing the $NO_X$ generation rate in the exhaust gas experimentally determined for changes in the engine revolution speed Ne and the required torque Trqsol, and an optimum thermal efficiency map 603 (see FIG. 7) which will be explained later.

(Main Fuel Injection Control)

First, the main fuel injection control will be explained below referring to FIG. 4.

At the start of the main fuel injection control, a required torque calculating unit 501 (required torque calculating unit) calculates the required torque Trqsol by referring to the two-dimensional map 501a stored in the ROM 203 by use of the accelerator angle $\theta_{th}$ (detected by the accelerator angle sensor $S_{Acc}$) and the engine revolution speed Ne (obtained by the CPU 202 of the ECU 50A by the conversion from the pulse signals supplied from the crank angle sensor Sa).

A target main fuel injection quantity calculating unit 505 (fuel injection quantity calculating unit) calculates the target main fuel injection quantity Fsol by referring to the three-dimensional map 505a stored in the ROM 203 by use of the required torque Trqsol calculated by the required torque calculating unit 501, the new air flow FAir measured by the air flow sensor $S_{Air}$, and the engine revolution speed Ne.

Based on the target main fuel injection quantity Fsol obtained above and target common rail pressure Pcsol which will be explained later, the PCCI combustion main fuel injection control unit 511 determines excitation time (injection timing and injection time) of each fuel injector 5, outputs the result to the fuel injector drive circuit 301 (see FIG. 3), and thereby controls the injection timing and the injection time according to PCCI combustion conditions.

To "control the injection timing and the injection time according to PCCI combustion conditions" means to control the injection timing of the main fuel so that the main fuel (to which hydrogen has been added up to a prescribed volume concentration (converted value under the standard atmospheric pressure, explained later) with respect to the amount of the new intake air) ignites after completion of the main fuel injection and after TDC (Top Dead Center) and so as to reduce the amount of $NO_X$ in the exhaust gas.

Incidentally, a "fuel supply control unit" described in the appended claims is formed by the target main fuel injection quantity calculating unit 505, the PCCI combustion main fuel injection control unit 511, a common rail pressure calculating unit 512 (explained later) and a common rail pressure control unit 513 (explained later).

Figure 5:
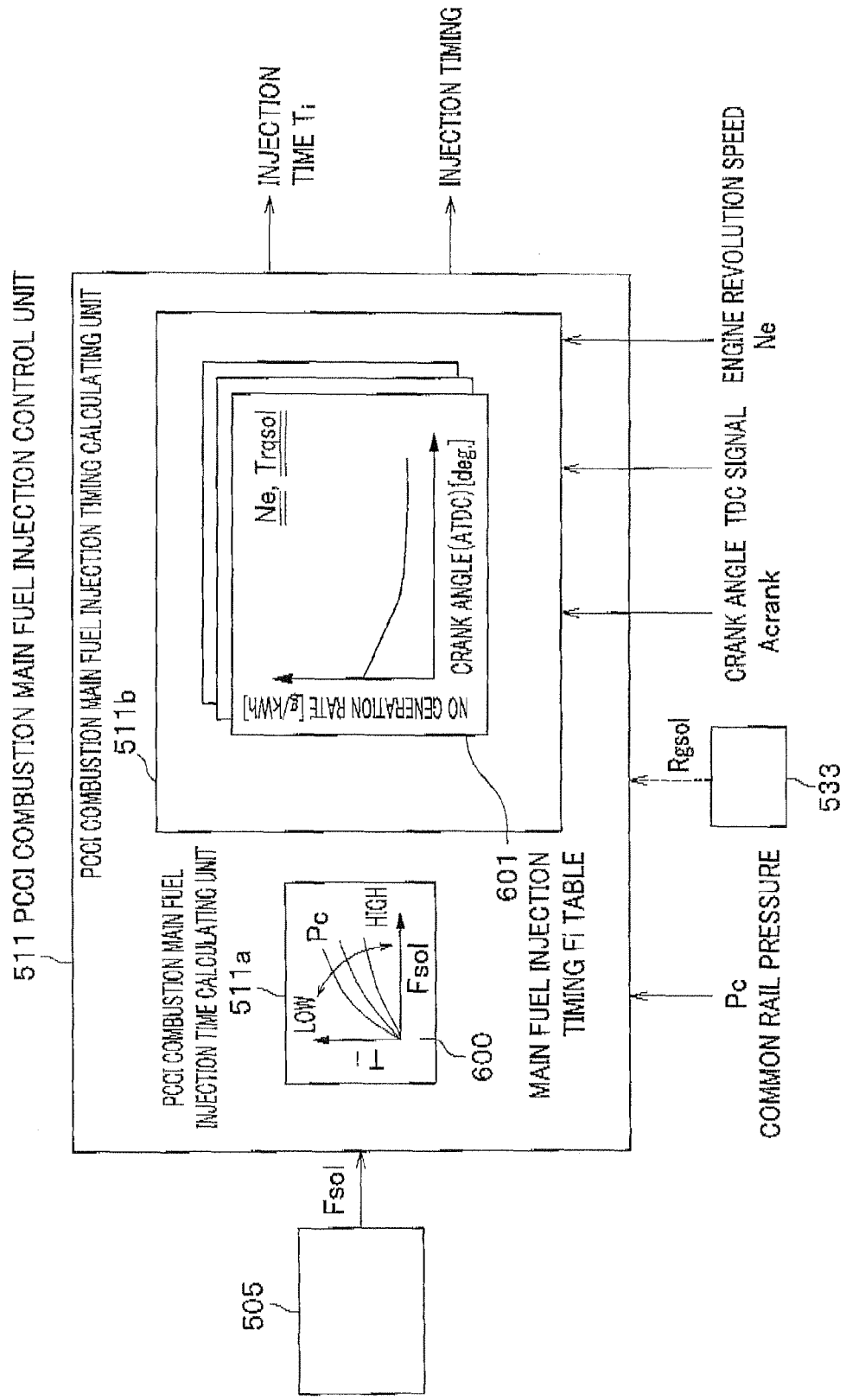
FIG. 5 is a detailed functional block diagram of a PCCI combustion main fuel injection control unit which is shown in the functional block diagram (FIG. 4) of the engine electronic control unit in the first embodiment.

Next, the PCCI combustion main fuel injection control unit 511 will be explained in more detail referring to FIG. 5. FIG. 5 is a detailed functional block diagram of the PCCI combustion main fuel injection control unit 511 shown in the functional block diagram (FIG. 4) of the engine electronic control unit in the first embodiment.

The PCCI combustion main fuel injection control unit 511 includes a PCCI combustion main fuel injection time calculating unit 511a (exhaust NOx concentration storage unit) and a PCCI combustion main fuel injection timing calculating unit 511b.

The PCCI combustion main fuel injection time calculating unit 511a calculates the main fuel injection time Ti by referring to the common rail pressure Pc and the target main fuel injection quantity Fsol based on the map 600 for determining the main fuel injection time corresponding to the previously obtained values of the common rail pressure Pc and the target main fuel injection quantity Fsol. In FIG. 5, the horizontal axis of the map 600 for determining the main fuel injection time Ti represents the target main fuel injection quantity Fsol and the vertical axis represents the main fuel injection time Ti (using the common rail pressure Pc as a parameter).

Subsequently, the PCCI combustion main fuel injection timing calculating unit 511b calculates the main fuel injection timing Fi by referring to the required torque Trqsol and the engine revolution speed Ne and using the main fuel injection timing Fi table 601 (exhaust $NO_X$ concentration data) electronically stored in the ROM 203.

Figure 6:
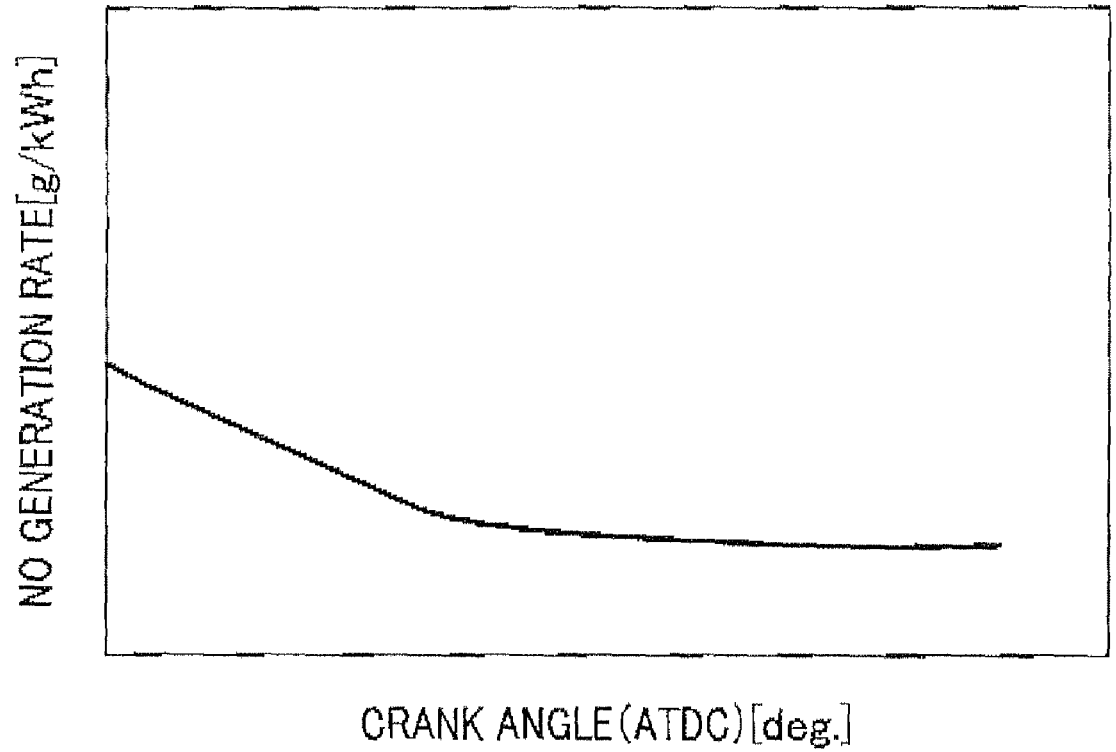
FIG. 6 is a graph showing an example of a main fuel injection timing Fi table (relationship between main fuel injection timing and NO generation rate) employed by the PCCI combustion main fuel injection control unit.

An example of the main fuel injection timing Fi table 601 is shown in FIG. 6, in which the horizontal axis represents the main fuel injection timing Fi (in terms of the crank angle), the vertical axis represents the NO generation rate (g/kWh), and discrete values of the engine revolution speed Ne and the required torque Trqsol are used as parameters of the table. In this case, the PCCI combustion main fuel injection timing calculating unit 511b calculates the main fuel injection timing Fi that minimizes the NO generation rate (g/kWh) by referring to the values of the engine revolution speed Ne and the required torque Trqsol, searching for a main fuel injection timing Fi tables 601 having parameters close to the values of the engine revolution speed Ne and the required torque Trqsol, determining a crank angle (main fuel injection timing Fi) minimizing the NO generation rate (g/kWh) in each of the tables 601 found by the search, and performing interpolation between/among the determined crank angles in each tables 601, for example.

In the horizontal axis of FIG. 6 (CRANK ANGLE (ATDC)), 0 degrees corresponds to TDC (Top Dead Center), positive angles correspond to ATDC (After Top Dead Center), and negative angles correspond to BTDC (Before Top Dead Center).

The table (graph) shown in FIG. 6 (indicating the relationship between the main fuel injection timing and the generation rate of exhaust NO gas) is an excerpt from the main fuel injection timing Fi tables 601 shown in FIG. 5. The table of FIG. 6 represents data obtained under the specific condition (main fuel injection pressure=150 MPa, engine revolution speed Ne=1500 rpm, heat release=13 kW). In FIG. 6, the NO generation rate is relatively high in a range of small crank angles (ATDC), and becomes substantially constant after a certain crank angle.

Thus, the NO generation rate in PCCI combustion can be reduced by referring to a main fuel injection timing Fi table 601 found with the two-dimensional parameters, determining the main fuel injection timing minimizing the NO generation rate, and driving each fuel injector 5 according to the determined timing.

After calculating the main fuel injection time Ti and the main fuel injection timing Fi as above, the PCCI combustion main fuel injection control unit 511 outputs signals representing the main fuel injection time Ti and the main fuel injection timing Fi to the fuel injector drive circuit 301.

(Common Rail Pressure Control)

The common rail pressure calculating unit 512 calculates the target common rail pressure Pcsol by referring to the common rail pressure two-dimensional map 512a by use of the required torque Trqsol (operational status information on the internal combustion engine) obtained by the required torque calculating unit 501 and the engine revolution speed Ne. Subsequently, the common rail pressure control unit 513 controls the common rail pressure Pc to equalize it to the target common rail pressure Pcsol, by comparing the signal from the common rail pressure sensor $S_{Pc}$ (representing the common rail pressure Pc) with the target common rail pressure Pcsol, generating a control signal based on the result of the comparison, and outputting the control signal to the pressure regulating valve 72.

(Exhaust Gas Reflux Control)

Meanwhile, a target air-fuel ratio calculating unit 506 calculates the target air-fuel ratio A/Fsol (for compatibility of NOx reduction and smoke reduction) by referring to the two-dimensional map 506a by use of the required torque Trqsol and the engine revolution speed Ne. Subsequently, a target new air flow calculating unit 507 calculates target new air flow FAsol using the target air-fuel ratio A/Fsol obtained above and the target main fuel injection quantity Fsol obtained by the target main fuel injection quantity calculating unit 505 (FAsol=Fsol×A/Fsol). A new air flow control unit 508 controls the new air flow FAir to equalize it with the target new air flow FAsol. In this control (new air flow control), the new air flow FAir is changed and adjusted not by directly adjusting the amount (flow) of supply of the new air but by adjusting the amount (flow) of reflux of the exhaust gas. Specifically, instead of determining a correction value regarding the new air, the new air flow control unit 508 determines an operational value EGRsol of the EGR valve 24 by first determining a basic operational value EGRbase of the EGR valve 24 based an the target new air flow FAsol and then performing feedback correction based on the deviation (FAsol−FAir) of the new air flow FAir. An FOR valve control unit 509 generates an open angle signal corresponding to the operational value EGRsol obtained above and outputs the open angle signal to the EGR valve drive circuit 304 (see FIG. 3). The EGR valve drive circuit 304 receiving the open angle signal controls the open angle of the EGR valve 24 to equalize it with the operational value EGRsol based on the signal from the EGR valve lift sensor 24a of the EGR valve 24.

(Throttle Valve Control)

A target intake air throttling level calculating unit 514 calculates target intake air throttling level THsol by referring to the two-dimensional map 514a by use of the target main fuel injection quantity Fsol obtained by the target main fuel injection quantity calculating unit 505 and the engine revolution speed Ne. Using the target intake air throttling level THsol, a throttle valve control unit 515 controls the open angle of the throttle valve 14 by feedback-controlling the signal from the throttle angle sensor 14a.

(VGT Control)

Further, a target boost pressure calculating unit 516 calculates target boost pressure Boostsol by referring to the two-dimensional map 516a by use of the required torque Trqsol obtained by the required torque calculating unit 501 and the engine revolution speed Ne, Using the target boost pressure Boostsol and the boost pressure Psa (in a part of the intake path 10 downstream of the throttle valve 14) detected by the boost pressure sensor $S_{Psa}$, a boost pressure control unit 517 calculates a (target) vane rotation position VGTsol of the turbocharger 12 so as to equalize the boost pressure Psa with the target boost pressure Boostsol and then outputs a signal representing the vane rotation position VGTsol to the VGT actuator drive circuit 305 (see FIG. 3). Using the vane rotation position VGTsol, the VGT actuator drive circuit 305 controls the VGT actuator 21 so as to equalize the actual vane rotation position with the vane rotation position VGTsol, by feedback-controlling the signal from the VGT position sensor 21a.

Incidentally, details of the control of the EGR quantity have been described in Japanese Laid-open Patent Publication No. 2000-104628, for example, and thus detailed description thereof is omitted here.

(Header Pressure Control for Premixed Gas)

A header pressure calculating unit 531 calculates target header pressure Pgsol by referring to the header pressure two-dimensional map 531a by use of the required torque Trqsol obtained by the required torque calculating unit 501 and the engine revolution speed Ne. Using the target header pressure Pgsol, a header pressure control unit 532 controls the header pressure $P_g$ to equalize it with the target header pressure Pgsol, by comparing the signal from the header pressure sensor $S_{Phg}$ (representing the header pressure $P_g$) with the target header pressure Pgsol, generating a control signal based on the result of the comparison, and outputting the control signal to the pressure regulating valve 33.

Incidentally, when a control instruction requesting an increase in the header pressure $P_g$ is received from a premixed gas injection control unit 535 as will be explained later, the header pressure control unit 532 executes the control so as to increase the header pressure $P_g$ according to the control instruction.

(Premixed Gas Injection Control)

Figure 7:
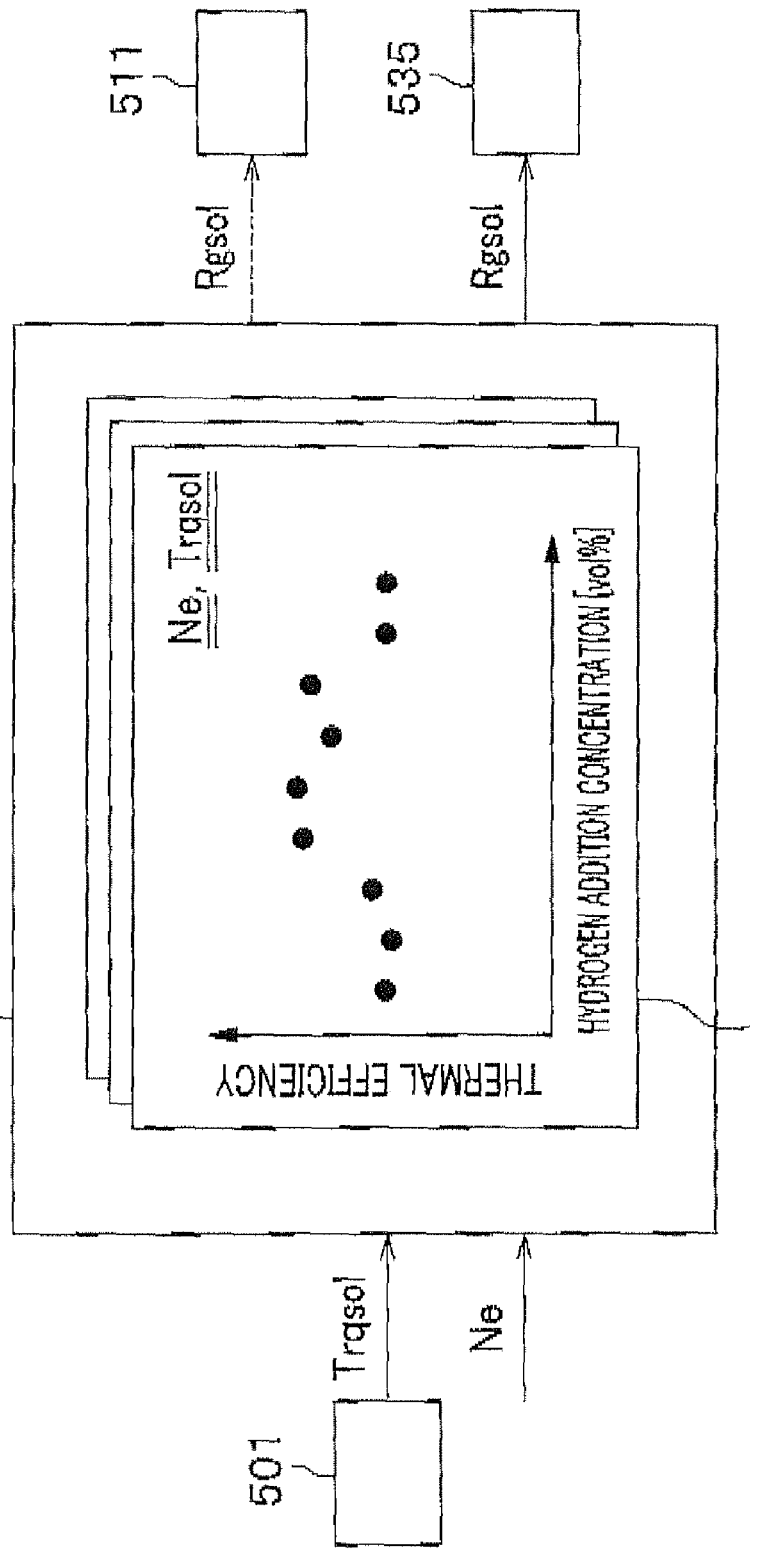
FIG. 7 is a detailed functional block diagram of a required premixed gas calculating unit which is shown in the functional block diagram (FIG. 4) of the engine electronic control unit in the first embodiment.
Figure 8A:
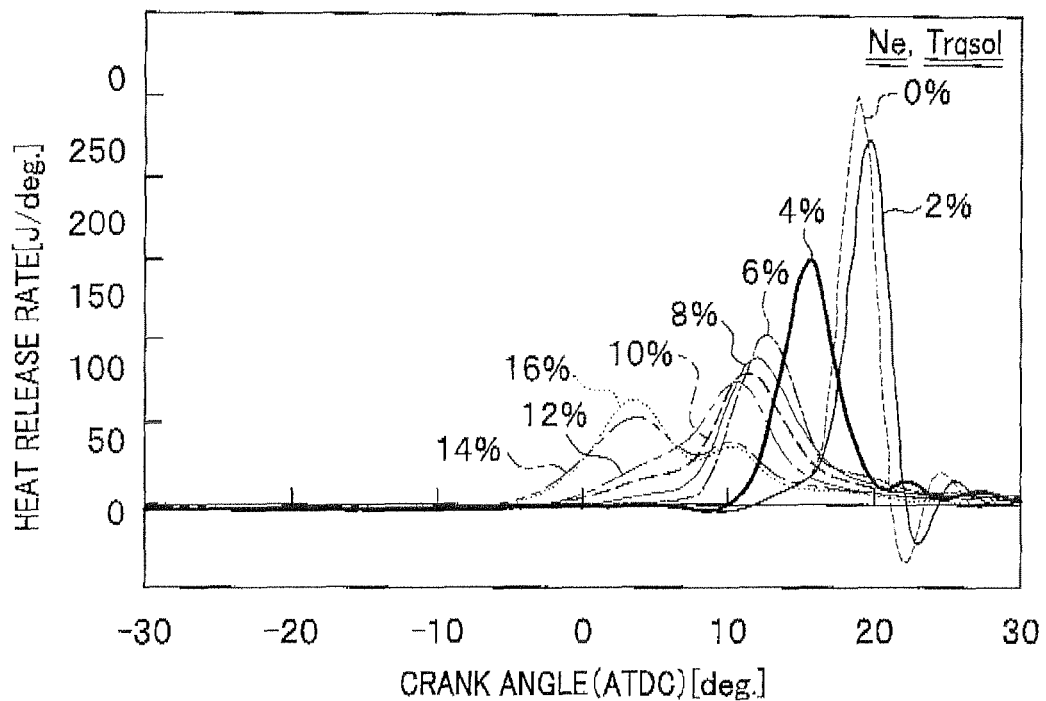
FIG. 8A is a graph showing the time-variation of a heat release rate (combustion waveform), wherein hydrogen addition concentration in the intake air is used as a parameter and the passage of time (horizontal axis) is represented by the crank angle.
Figure 8B:
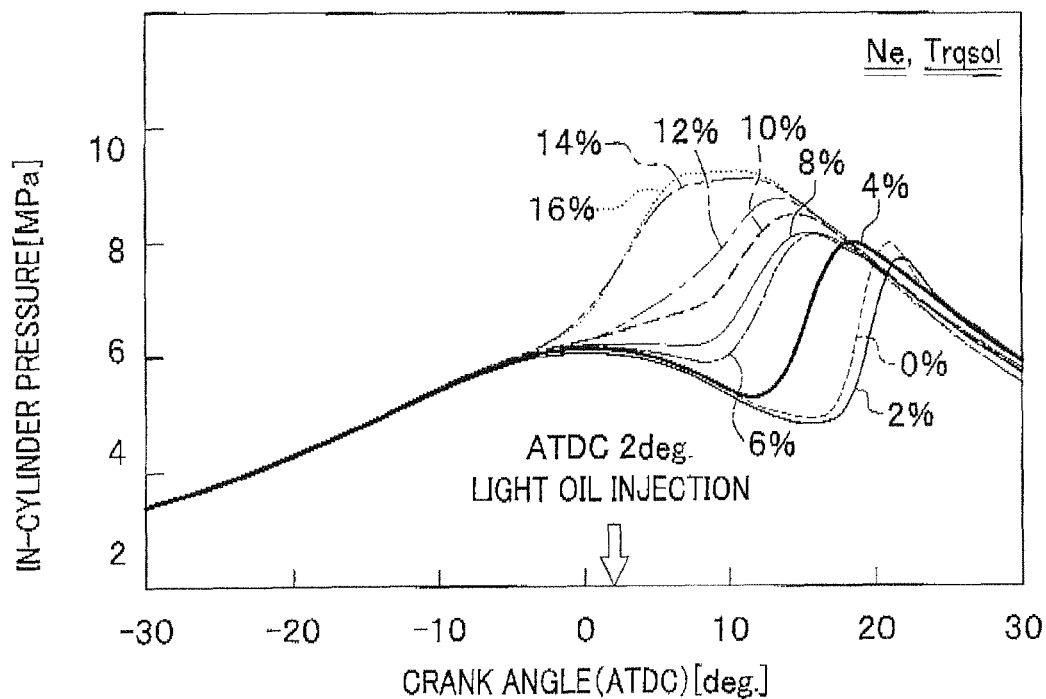
FIG. 8B is a graph showing the time-variation of in-cylinder pressure (changing depending on the hydrogen addition concentration), wherein the hydrogen addition concentration in the intake air is used as a parameter and the passage of time (horizontal axis) is represented by the crank angle.
Figure 9:
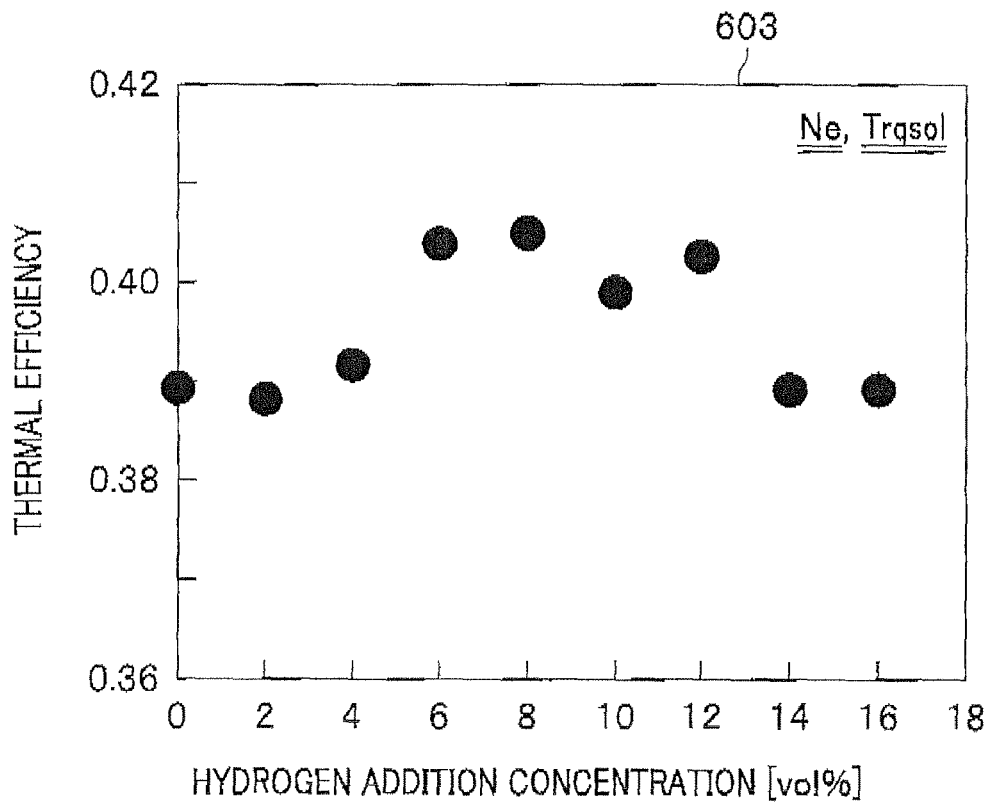
FIG. 9 is a graph showing an example of an optimum thermal efficiency map (relationship between the hydrogen addition concentration and thermal efficiency) employed by the required premixed gas calculating unit in the first embodiment.

Next, a method for the premixed gas injection control will be described referring to FIG. 7 through FIG. 9. FIG. 7 is a detailed functional block diagram of a required premixed gas calculating unit 533 shown in the functional block diagram (FIG. 4) of the engine electronic control unit in the first embodiment. FIG. 8A is a graph showing the time-variation of the heat release rate (combustion waveform), wherein the hydrogen addition concentration in the intake air (concentration of hydrogen added to the intake air) is used as a parameter and the passage of time (horizontal axis) is represented by the crank angle. FIG. 8B is a graph showing the time-variation of the in-cylinder pressure (changing depending on the hydrogen addition concentration), wherein the hydrogen addition concentration in the intake air is used as a parameter and the passage of time (horizontal axis) is represented by the crank angle. FIG. 9 is a graph for explaining the relationship between the hydrogen addition concentration and thermal efficiency in the first embodiment.

As shown in FIG. 7, the required premixed gas calculating unit 533 (hydrogen addition concentration-related combustion data storage unit, hydrogen addition quantity determining unit) determines the hydrogen addition concentration Rgsol by referring to the optimum thermal efficiency map 603 by use of the required torque Trqsol obtained by the required torque calculating unit 501 and the engine revolution speed Ne.

The method of generating the optimum thermal efficiency map 603 will be explained below. FIG. 8A shows examples of the time-variation of the heat release rate (combustion waveform) under specific conditions (main fuel injection pressure=150 MPa, engine revolution speed Ne=1500 rpm, heat release=13 kW). The combustion waveforms in FIG. 8A were obtained by fixing the main fuel injection timing at 2 degrees (ATDC) and changing the hydrogen addition concentration from 0 vol % to 16 vol %. FIG. 8B shows the result of a study on the effect of the hydrogen concentration on the in-cylinder pressure and the heat release rate. In FIG. 8A, the waveform of the heat release rate (combustion waveform) and the ignition timing changed remarkably according to the change in the hydrogen addition concentration. The cause of the change in the combustion waveform and the ignition timing will be briefly considered below from the viewpoint of the source of ignition. The ignition source in the case where the hydrogen addition concentration is 0 Vol % is self ignition of light oil. In the case of 2 Vol % hydrogen addition concentration, the ignition delay period was slightly longer compared to the 0 Vol % case, which implies that ignition-suppressing effect of hydrogen was observed in some degree even though the ignition source was the self ignition of light oil similarly to the 0 Vol % case. Considering that the minimum combustible air-fuel ratio of hydrogen is 4 Vol %, it is contemplated that hydrogen itself does not exhibit self ignition but conversely has the ignition-suppressing effect when the hydrogen addition concentration is less than 4 Vol %. In the 16 Vol % case and the 14 Vol % case, the ignition source seems to be self ignition of hydrogen before TDC. In the cases of 12 Vol %, 10 Vol % and 8 Vol %, the ignition source seems to be self ignition of hydrogen around TDC.

In the range from 8 Vol % to 16 Vol %, the combustion seems to be of a type in which ignition of the fuel progresses upon the injection of the fuel into hydrogen flame already caused by the self ignition of hydrogen. In the 6 Vol % case and the 4 Vol % case, the self ignition of hydrogen and ignition associated with fuel injection can be regarded as major ignition sources. The ignition associated with fuel injection can include self ignition of light oil in which hydrogen is involved, electric ignition caused by static electricity, plasma, etc. accompanying the fuel, etc. As above, the existence of multiple ignition sources, changing depending on the hydrogen addition concentration, is suggested by the combustion waveforms of FIG. 8A. By using one or more of the ignition sources, it is possible to control the time-variation of the heat release rate (combustion waveform) and the ignition delay period, similarly to the control by the cetane number of the fuel. Further, it is apparent from the above result that the time-variation of the heat release rate (combustion waveform) and the ignition timing can be controlled by adjusting the hydrogen addition concentration (concentration of hydrogen added to the intake air).

The ATDC injection of the fuel into intake air containing 2 Vol % of hydrogen (hydrogen addition concentration=2 Vol %) results in rapid progress of combustion and a following sharp drop in the heat release rate, while the ATDC injection of the fuel into intake air containing 6 Vol % of hydrogen (hydrogen addition concentration=6 Vol %) results in a gradual combustion waveform.

Incidentally, while intake air containing no hydrogen (hydrogen addition concentration=0 Vol %) is not assumed in this embodiment, such a case (0 Vol %) is also shown in FIGS. 8A and 8B for the sake of comparison or as a reference for the estimation of data in intermediate cases (with an intermediate hydrogen addition concentration of 1 Vol %, for example).

The ATDC injection of the main fuel into intake air containing no hydrogen (hydrogen addition concentration=0 Vol %) results in extremely rapid progress of combustion (not satisfying the aforementioned PCCI combustion conditions) and a rapid deterioration in the thermal efficiency, while the ATDC injection of the main fuel into intake air containing 4 Vol % or more of hydrogen (hydrogen addition concentration≧4 Vol %) allows for a more gradual combustion waveform (satisfying the PCCI combustion conditions) and combustion with high efficiency.

FIG. 8B shows the time-variation of the in-cylinder pressure in a period in the PCCI combustion including the premixed gas injection and the main fuel injection, wherein the horizontal axis represents the crank angle (ATDC) [deg.] and the vertical axis represents the in-cylinder pressure [MPa]. The engine revolution speed Ne, the required torque Trqsol and the hydrogen addition concentrations [Vol %] in FIG. 8B correspond to those in FIG. 8A.

The optimum thermal efficiency map 603 (regarding a certain combination of the engine revolution speed Ne and the required torque Trqsol like that shown in FIG. 8A) is obtained by selecting combustion waveforms (corresponding to specific hydrogen addition concentrations) satisfying the PCCI combustion conditions from all the combustion waveforms (time-variations of the heat release rate) previously obtained experimentally for the certain combination of the engine revolution speed Ne and the required torque Trqsol (using the hydrogen addition concentration [Vol %] as the parameter)

and then plotting the thermal efficiency of each of the selected combustion waveforms (with hydrogen addition concentrations suitable for satisfying the PCCI combustion conditions) on a graph like FIG. 9 (with a horizontal axis representing the hydrogen addition concentration and a vertical axis representing the thermal efficiency). Such optimum thermal efficiency maps 603 have been gathered for a lot of combinations of the engine revolution speed Ne and the required torque Trqsol that are possible within a regular operation area of the engine 1.

An example of the optimum thermal efficiency map 603 (regarding the particular combination of the engine revolution speed Ne and the required torque Trqsol corresponding to FIG. 8A) is shown in FIG. 9, wherein the horizontal axis represents the hydrogen addition concentration [Vol %] and the vertical axis represents the thermal efficiency. In the example of FIG. 9, the highest thermal efficiency can be achieved by ATDC fuel injection into intake air containing 8 Vol % of hydrogen (hydrogen addition concentration=8 Vol %). In this example, the thermal efficiency keeps increasing until the hydrogen addition concentration reaches 6-8 Vol % and thereafter drops as the hydrogen concentration is increased further. The major ignition source is self ignition of light oil when the hydrogen addition concentration is low, while self ignition of hydrogen becomes dominant when the hydrogen addition concentration is high. In an intermediate concentration range, the self ignition of light oil, the self ignition of hydrogen and ignition caused by the main fuel injection coexist. The ignition caused by the main fuel injection can include ignition of light oil in which hydrogen is involved, electric ignition caused by static electricity, plasma, etc. accompanying the fuel, etc. As above, the ignition source seems to diversify depending on the hydrogen addition concentration and consequently affect the heat release waveform (combustion waveform).

Therefore, the thermal efficiency in the PCCI combustion can be improved considerably by determining the hydrogen addition concentration Rgsol maximizing the thermal efficiency based on the optimum thermal efficiency map 603 and then sending a signal representing Rgsol to the premixed gas injection control unit 535 (see FIG. 4) so as to drive the gas injector 31 accordingly.

Figure 10:
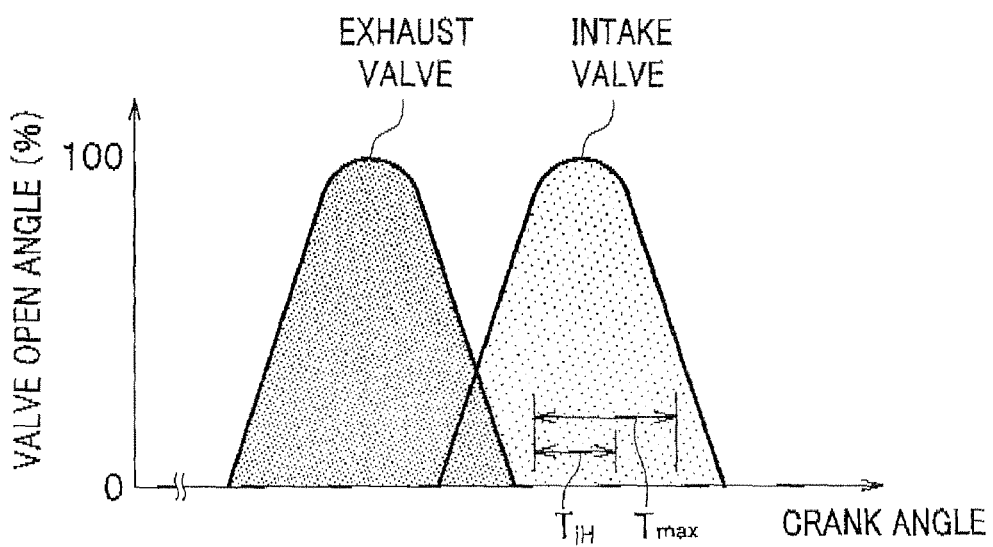
FIG. 10 is a graph for explaining the injection timing and the injection time of the gas injector while referring to the open/close timing of the exhaust valve and the intake valve.

The premixed gas injection control unit 535 calculates the injection time corresponding to the hydrogen addition concentration Rgsol based on the header pressure $P_g$ detected by the header pressure sensor $S_{Phg}$, calculates a maximum permissible injection time $T_{max}$ during which the exhaust valve 17 is totally closed and the intake valve 16 is open (see FIG. 10) based on the current value of the engine revolution speed Ne, checks whether the injection time is within the maximum permissible injection time $T_{max}$ or not, and instructs the header pressure control unit 532 to increase the header pressure $P_g$ when the injection time is not within the maximum permissible injection time $T_{max}$. The premixed gas injection control unit 535 outputs control signals representing the injection timing and the injection time to the gas injector drive circuit 302 so that the actuator 31a of the gas injector 31 is driven accordingly.

Incidentally, a "gas supply control unit" described in the appended claims is formed by the header pressure calculating unit 531, the header pressure control unit 532, the required premixed gas calculating unit 533 and the premixed gas injection control unit 535.

The determination of the hydrogen addition concentration Rgsol may be conducted in consideration of the peak value (Hmax) of the combustion waveform, the half-value width (a) of the combustion waveform, the crank angle corresponding to the peak value Hmax, the area of the combustion waveform, etc.

Incidentally, the determination of the hydrogen addition concentration for achieving high thermal efficiency may also be conducted in consideration of a peak value (Hmax) of the combustion waveform (see FIG. 8A), a half-value width (a) of the combustion waveform, a crank angle corresponding to the peak value Hmax, the area of the combustion waveform, etc.

<<Premixed Gas Injection Control and Main Fuel Injection Control>>

Figure 11:
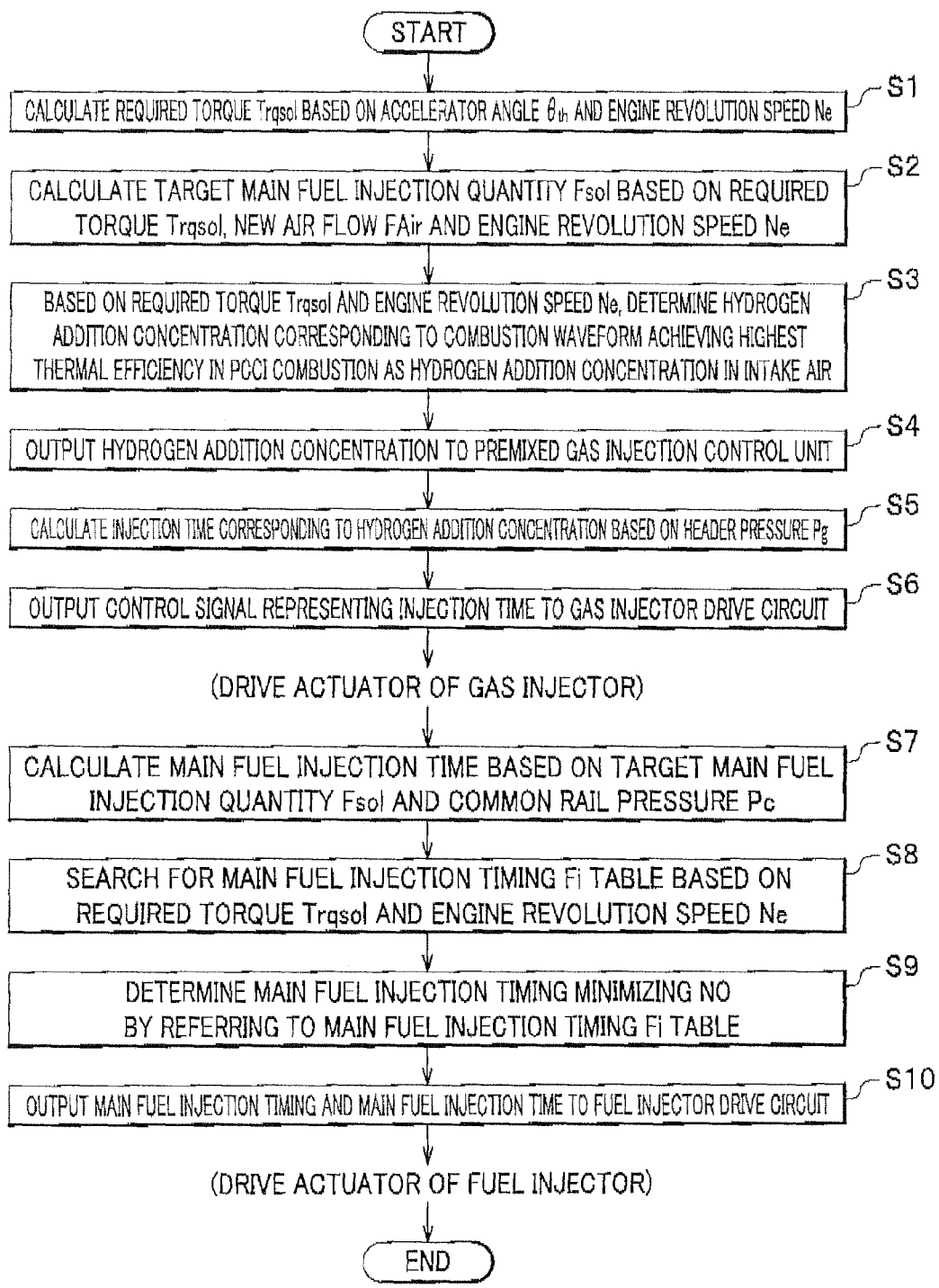
FIG. 11 is a flow chart showing the flow of a method of premixed gas injection control and main fuel injection control.

Next, a method for the premixed gas injection control and the main fuel injection control will be explained below referring to FIG. 11 (and FIG. 3, FIG. 4 and FIG. 5 as needed). FIG. 11 is a flow chart showing the flow of the method of the premixed gas injection control and the main fuel injection control.

In step S1, the required torque calculating unit 501 (required torque calculating unit) calculates the required torque Trqsol based on the accelerator angle $\theta_{th}$ and the engine revolution speed Ne.

In step S2, the target main fuel injection quantity calculating unit 505 calculates the target main fuel injection quantity Fsol based on the required torque Trqsol, the new air flow FAir and the engine revolution speed Ne.

In step S3, based on the required torque Trqsol and the engine revolution speed Ne, the required premixed gas calculating unit 533 determines hydrogen addition concentration corresponding to the combustion waveform achieving the highest thermal efficiency in the PCCI combustion as the hydrogen addition concentration in the intake air.

In step S4, the required premixed gas calculating unit 533 outputs the hydrogen addition concentration to the premixed gas injection control unit 535.

In step S5, the premixed gas injection control unit 535 calculates the injection time corresponding to the hydrogen addition concentration based on the header pressure $P_g$.

In step S6, the premixed gas injection control unit 535 outputs the control signal representing the injection time to the gas injector drive circuit 302 (see FIG. 3).

Then, the gas injector drive circuit 302 drives the actuator 31a of the gas injector 31 (see FIG. 3) according to the control signal.

In step S7, the PCCI combustion main fuel injection time calculating unit 511a calculates the main fuel injection time based on the target main fuel injection quantity Fsol and the common rail pressure Pc.

In step S8, the PCCI combustion main fuel injection timing calculating unit 511b searches for a main fuel injection timing Fi table 601 (relevant one of the main fuel injection timing Fi tables 601) based on the required torque Trqsol and the engine revolution speed Ne.

In step S9, the PCCI combustion main fuel injection timing calculating unit 511b determines the main fuel injection timing minimizing NO (NO generation rate) by referring to the main fuel injection timing Fi table 601.

In step S10, the PCCI combustion main fuel injection control unit 511 outputs the main fuel injection timing and the main fuel injection time to the fuel injector drive circuit 301 (see FIG. 3). Then, the fuel injector drive circuit 301 drives the actuator 5a of the fuel injector 5 (see FIG. 3) according to the main fuel injection timing and the main fuel injection time, by which the process for the premixed gas injection control and the main fuel injection control is completed.

(Action and Effect)

In this embodiment, the required torque calculating unit 501 calculates the required torque Trqsol based on the accelerator angle $\theta_{th}$ and the engine revolution speed Ne. The target main fuel injection quantity calculating unit 505 calculates the target main fuel injection quantity Fsol based on the required torque Trqsol, the new air flow FAir and the engine revolution speed Ne. Based on the required torque Trqsol and the engine revolution speed Ne, the required premixed gas calculating unit 533 determines hydrogen addition concentration corresponding to the combustion waveform achieving the highest thermal efficiency in the PCCI combustion as the hydrogen addition concentration in the intake air. The premixed gas injection control unit 535 calculates the injection time corresponding to the hydrogen addition concentration based on the header pressure $P_g$, outputs the control signal representing the injection time to the gas injector drive circuit 302, and thereby controls the driving of the gas injector 31.

The PCCI combustion main fuel injection time calculating unit 511a of the PCCI combustion main fuel injection control unit 511 calculates the main fuel injection time based on the target main fuel injection quantity Fsol and the common rail pressure Pc. Meanwhile, the PCCI combustion main fuel injection timing calculating unit 511b of the PCCI combustion main fuel injection control unit 511 searches for a main fuel injection timing Fi table 601 (relevant one of the main fuel injection timing Fi tables 601) based on the required torque Trqsol and the engine revolution speed Ne and then determines the main fuel injection timing minimizing NO (NO generation rate) by referring to the main fuel injection timing Fi table 601. The PCCI combustion main fuel injection control unit 511 outputs the main fuel injection timing and the main fuel injection time to the fuel injector drive circuit 301 (see FIG. 3) and thereby controls the injection timing and the injection time of the main fuel according to the PCCI combustion conditions.

As above, by this embodiment, both the improvement of thermal efficiency and the reduction of NO generation can be achieved in the PCCI combustion.

Figure 12:
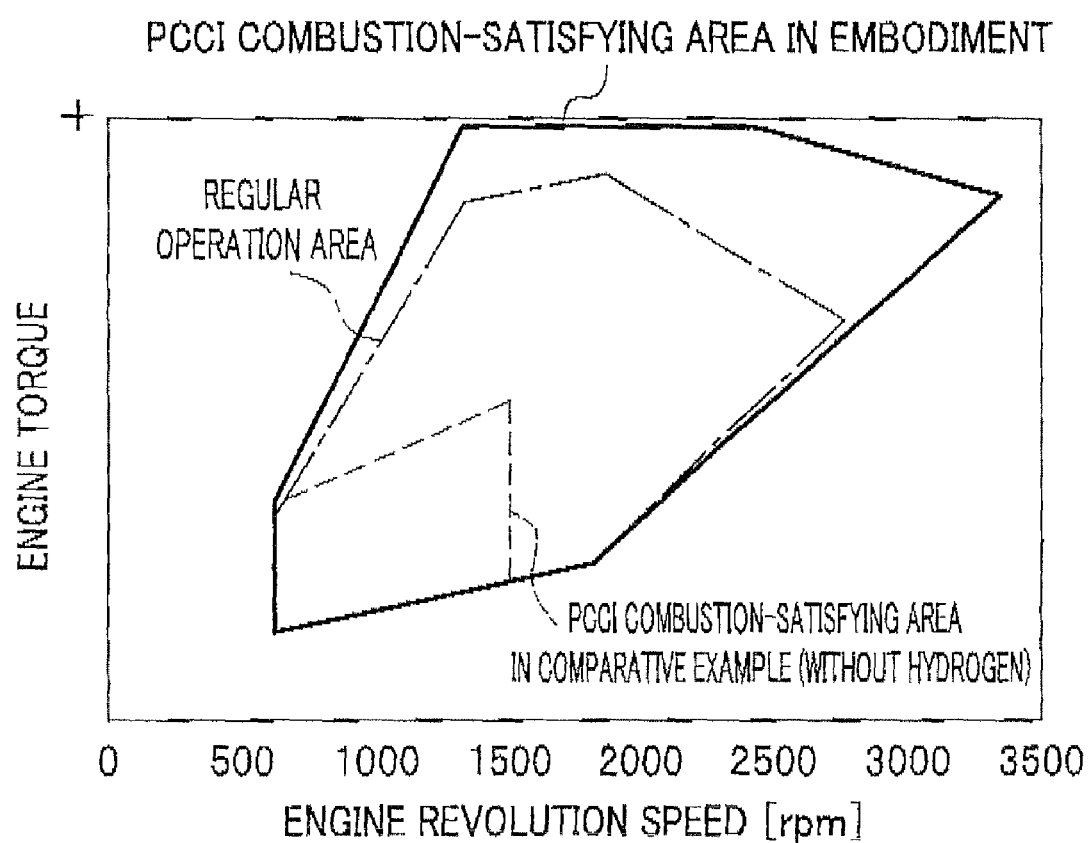
FIG. 12 is a graph comparing a PCCI combustion possibility area (area regarding the engine revolution speed and the engine torque in which the PCCI combustion is possible)

FIG. 12 is a graph comparing a PCCI combustion possibility area (area regarding the engine revolution speed and the engine torque in which the PCCI combustion is possible) according to this embodiment with the PCCI combustion possibility area according to a comparative example. In FIG. 12, solid lines represent the PCCI combustion possibility area in this embodiment, broken lines represent the PCCI combustion possibility area in the comparative example, and chain lines represent a PCCI combustion area required in normal operation of the engine. As shown in FIG. 12, PCCI combustion covering a larger regular operation area compared to the comparative example can be realized by this embodiment, by which PM and NOx in the exhaust gas can be reduced more efficiently.

FIG. 13 is an explanatory drawing showing an example of improvement of the thermal efficiency by changing the hydrogen addition concentration. In this experiment, JIS No. 2 light oil was used as the fuel, the main fuel injection pressure was 150 MPa, the engine revolution speed Ne was 1500 rpm, the heat release was 13 kW, and the main fuel injection was ATDC 2 degrees in terms of the crank angle.

In contrast to a comparative example (CONTROL) in which the hydrogen addition concentration (concentration of the premixed gas) was 4 vol %, the hydrogen addition concentration was set at 8 vol % (to cause a combustion waveform allowing for higher thermal efficiency) in this embodiment, resulting in a 5.7% increase in the thermal efficiency. Incidentally, the comparative example corresponds to the heat release rate waveform shown in FIG. 14 of Japanese Laid-open Patent Publication No. 2010-014085.

FIG. 14 is an explanatory drawing showing an example of reduction of the NO generation rate by optimizing the hydrogen addition concentration and the main fuel injection timing. In this experiment, JIS No. 2 light oil was used as the fuel, the main fuel injection pressure was 150 MPa, the engine revolution speed No was 1500 rpm, and the heat release was 13 kW.

In contrast to a comparative example (CONTROL) in which the hydrogen addition concentration was 4 vol % and the main fuel injection timing was ATDC 2 degrees in terms of the crank angle, the hydrogen addition concentration and the main fuel injection timing were optimized at 8 vol % and ATDC 2 degrees in regard to the thermal efficiency in this embodiment, resulting in a 33% reduction of the NO generation rate [g/kWh]. The main fuel injection timing was further optimized to ATDC 8 degrees to reduce $NO_X$, by which the ignition timing was delayed and the NO generation rate [g/kWh] was further reduced by 20%, resulting in a total reduction of 53% in the NO generation rate compared to the comparative example. As above, both the improvement of thermal efficiency and the reduction of $NO_X$ were successfully achieved by this embodiment.

FIG. 15 is a graph showing the relationship between the hydrogen addition concentration and the NO generation rate in the first embodiment. As shown in FIG. 15, the NO generation rate is reduced considerably by this embodiment (hydrogen addition concentration=8 vol %) compared to the comparative example shown in FIG. 14 (hydrogen addition concentration=4 vol %).

FIG. 16A is a graph comparing two combustion waveforms obtained by changing the fuel injection timing. FIG. 16B is a graph showing an example of a change in the in-cylinder pressure caused by a change in the fuel injection timing corresponding to FIG. 16A. In this experiment, JIS No. 2 light oil was used as the fuel, the main fuel injection pressure was 150 MPa, the engine revolution speed Ne was 1500 rpm, the heat release was 13 kW, and the hydrogen addition concentration was 8 vol %. In FIG. 16A, the shapes of the two heat release rate waveforms (combustion waveforms) are substantially identical. In this case where the fuel injection timing is delayed from ATDC 2 degrees to ATDC 8 degrees (optimization of ignition timing), the combustion waveform (peak value, half-value width) hardly changes in spite of the change in the fuel injection timing. This result made it clear that control of the combustion waveform through the hydrogen addition concentration is possible.

An area (regarding the main fuel injection timing and the hydrogen addition concentration) allowing for the improvement of thermal efficiency and the reduction of $NO_X$ generation by the improvement of PCCI combustion according to this embodiment is shown in FIG. 17.

FIG. 17 is a graph showing an area (regarding the main fuel injection timing and the hydrogen addition concentration) in which the improvement of thermal efficiency and the reduction of NO generation by the improvement of PCCI combustion can be expected, wherein the horizontal axis represents the main fuel injection timing in terms of the crank angle (ATDC) [deg.] (negative angles correspond to BTDC (Before Top Dead Center)) and the vertical axis represents the hydrogen addition concentration [vol %] (volume percentage of hydrogen added to the intake air).

According to this embodiment, the improvement of thermal efficiency and the reduction of $NO_X$ generation by the improvement of PCCI combustion can be expected in the area satisfying 4 [vol %]≦hydrogen addition concentration range≦16 [vol %] and ATDC −2 [deg.]≦main fuel injection timing≦ATDC 10 [deg.].

PCCI combustion covering a large regular operation area can be realized and the reduction of PM and $NO_X$ in the exhaust gas is possible also in the middle/high-load operation area of the engine 1. Therefore, the load on the DPF/LNC (Lean NOx Catalyst) system is lessened, or the system itself (and also the exhaust gas reflux system 120, possibly) can become unnecessary. Further, noise and vibration in the middle/high-load operation area can be reduced far more efficiently by this embodiment compared to conventional technology.

Moreover, the total capacity of the header pipe 32 and the gas supply pipes 76 is restricted and the pressure regulating valve 33 for controlling the header pressure $P_g$ is provided downstream of the hydrogen tank 34A in this embodiment. Thus, the pressure in the header pipe 32 and the gas supply pipes 76 can be changed properly depending on the engine revolution speed Ne, which makes it possible to set the injection time ($T_{Pi}$) of the premixed gas within a narrow variation range corresponding to the engine revolution speed Ne while keeping the injection time $T_{Pi}$ within the maximum permissible injection time $T_{max}$ and also avoiding a too short injection time $T_{Pi}$. Consequently, excellent responsiveness of the premixed gas supply to changes in the engine revolution speed Ne can be achieved.

In this embodiment, any type of diesel engine can be employed as the engine 1 without any restriction. The main fuel can be light oil or mixed fuel, such as light oil mixed with different fuel (plant-derived fuel (so-called "biofuel"), DME, GTL, etc.). Hydrocarbons contained in the light oil or GTL fuel may include alkane, alkene, alkyne, aromatic compound, alcohol, aldehyde, ester, etc. Ethanol, fatty acid methyl ester, etc. can be used as the biofuel.

Incidentally, while the main fuel injection timing Fi is calculated by the PCCI combustion main fuel injection timing calculating unit 511b by referring to the required torque Trqsol and the engine revolution speed Ne and using the main fuel injection timing Fi table 601 electronically stored in the ROM 203 in this embodiment, the main fuel injection timing Fi may be determined differently. For example, it is possible to input the hydrogen addition concentration Rgsol determined by the required premixed gas calculating unit 533 to the PCCI combustion main fuel injection timing calculating unit 511b and make the unit 511b calculate the main fuel injection timing Fi by referring to the required torque Trqsol, the engine revolution speed Ne and the hydrogen addition concentration Rgsol and using the main fuel injection timing Fi table 601 electronically stored in the ROM 203. In this case, the main fuel injection timing Fi table 601 is designed so that the main fuel injection timing Fi can be determined by using not only the required torque Trqsol and the engine revolution speed Ne but also the hydrogen addition concentration Rgsol as the parameters.

Second Embodiment

In the following, the outline of an engine control device in accordance with a second embodiment of the present invention will be described with reference to FIG. 3 and FIG. 18. FIG. 3 is a schematic block diagram for explaining the hardware configuration of an engine electronic control unit employed for the engine control device. FIG. 18 is a schematic functional block diagram of the engine control device in accordance with the second embodiment.

The engine control device 100B of the second embodiment differs from the engine control device 100A of the first embodiment in that a gas supply system 130B (gas supply unit) is employed in stead of the gas supply system 130A in the first embodiment. Accordingly, an ECU 50B (combustion control unit) is employed instead of the ECU 50A in the first embodiment. In FIG. 18, components equivalent to those in the first embodiment (FIG. 1) are assigned the same reference characters as those in the first embodiment and repeated explanation thereof is omitted for brevity.

The gas supply system 130B mainly includes a fuel reformer 37 (gas generating unit) for reforming the fuel supplied from the fuel tank 42 by a low-pressure pump (unshown) and thereby generating hydrogen or reformed gas containing hydrogen (hereinafter the "hydrogen or reformed gas containing hydrogen" will be referred to as "premixed gas"), a gas compressor 36 for compressing the premixed gas, a hydrogen tank 34B (pressure accumulator tank) for storing the compressed premixed gas in a pressure-accumulated state, the pressure regulating valve 33, the header pipe 32, the gas supply pipes 76, and the gas injectors 31 (gas injection valves) for injecting the premixed gas into the cylinders 2.

The fuel reformer 37 (including a reforming catalyst) generates the premixed gas by reforming the fuel from the unshown low-pressure pump in a prescribed atmosphere (air, oxygen-enriched air, nitrogen-enriched air, oxygen, nitrogen, carbon dioxide, water vapor, etc.) and supplies the premixed gas to the gas compressor 36.

The reforming reaction occurring on the reforming catalyst can include one or more reactions selected from steam reforming, partial oxidation, $CO_2$ reforming, water-gas shift reaction and autothermal reforming (combination of steam reforming and partial oxidation), for example.

The output level of the fuel reformer 37 generating the premixed gas (reformed gas) and the output of the gas compressor 36 are controlled by the ECU 50B so as to equalize the pressure PHb of the hydrogen tank 34B with a target pressure that has previously been set depending on the required torque Trqsol and the engine revolution speed Ne, for example.

The premixed gas which has been compressed by the gas compressor 36 is stored in the hydrogen tank 34B, flows to the header pipe 32 via the pressure regulating valve 33 placed downstream of the hydrogen tank 34B, and is supplied to the gas injectors 31 via the gas supply pipes 76 branching out from the header pipe 32 into the cylinders 2.

The premixed gas stored in the hydrogen tank 34B is decompressed into a prescribed injection pressure by the pressure regulating valve 33 which is controlled by the ECU 50B based on the signal from the header pressure sensor $S_{Phg}$ of the header pipe 32, flows through each gas supply pipe 76 (branching from the header pipe 32 into each cylinder 2), and is injected into the intake air from the injection hole (unshown) of each gas injector 31 placed in the vicinity of the intake port of each cylinder 2.

The gas supply system 130B (gas supply unit) is equipped with a hydrogen tank pressure sensor $S_{PHb}$ (see FIG. 18) for detecting the pressure PHb of the hydrogen tank 34B, a header pressure sensor $S_{Phg}$ (see FIG. 18) for detecting the pressure (premixed gas pressure) $P_g$ in the header pipe 32, and a hydrogen concentration sensor $S_H$ (see FIG. 18) for detecting the hydrogen concentration $v_H$ in the header pipe 32. Electric signals from the sensors are inputted to the ECU 50B.

The low-pressure pump (unshown) is installed in the fuel tank 42 together with fuel filters 43A and 43B (actually, one integrated filter although shown separately in FIG. 18), for example. The low-pressure pump sucks the fuel from the fuel tank 42 through intake pipes 62A and 62B (actually, one common pipe although shown separately in FIG. 18) and supplies the fuel to the intake side of the high-pressure supply pump 8 and the fuel reformer 37 via branched pipes.

The fuel reformer 37 is equipped with a built-in flow regulating valve (unshown) which is controlled by the ECU 50B. The flow regulating valve controls the flow rate of the fuel supplied to the fuel reformer 37 while returning surplus fuel to the fuel tank 42 via a return pipe 65B.

The above flow regulating valve (for fuel) and another unshown flow regulating valve (for pure water) of the fuel reformer 37 are controlled cooperatively to suit the output level of the fuel reformer 37 (production of the reformed gas (premixed gas) per unit time) controlled by the ECU 50B.

The reformed gas generated by the fuel reformer 37 as the premixed gas is compressed by the gas compressor 36 and is supplied to the hydrogen tank 34B via a check valve 35. The hydrogen tank 34B is equipped with the hydrogen tank pressure sensor $S_{PHb}$ detecting the hydrogen tank pressure PHb. The hydrogen tank pressure sensor $S_{PHb}$ outputs a signal representing the detected hydrogen tank pressure PHb to the ECU 50B. The ECU 50B controls the operation levels of the fuel reformer 37 and the gas compressor 36 based on the signal from the hydrogen tank pressure sensor $S_{PHb}$ and thereby controls the pressure PHb of the hydrogen tank 34B to equalize it with a target pressure that is determined depending on the operational status of the vehicle (e.g., the engine revolution speed Ne and the accelerator angle $\theta_{th}$).

The premixed gas stored in the hydrogen tank 34B in the pressure-accumulated state is decompressed from the hydrogen tank pressure PHb by the pressure regulating valve 33, supplied to the header pipe 32, and eventually supplied to the gas injector 31 of each cylinder 2 via each gas supply pipe 76 branching from the header pipe 32.

The header pipe 32 is provided with the header pressure sensor $S_{PHg}$ for detecting the header pressure $P_g$ (which substantially equals the injection pressure of the gas injector 31) and the hydrogen concentration sensor $S_H$ for detecting the hydrogen concentration $v_H$ in the premixed gas.

<<Explanation of Control Configuration of Gas Supply System>>

Next, control functional blocks of the ECU 50B relating to the gas supply system 130B will be explained below referring to FIG. 19, wherein components equivalent to those in the first embodiment (FIG. 4) are assigned the same reference characters as those in the first embodiment and repeated explanation thereof is omitted for brevity.

While the control functional blocks for the gas supply system 130A in the first embodiment included the header pressure calculating unit 531, the header pressure control unit 532, the required premixed gas calculating unit 533 and the premixed gas injection control unit 535, the control functional blocks for the gas supply system 130B in the second embodiment include a tank pressure control unit 536, the header pressure calculating unit 531, the header pressure control unit 532, the required premixed gas calculating unit 533, the premixed gas injection control unit 535 and a fuel reformer control unit 538.

The tank pressure control unit 536 outputs a control signal to a gas compressor drive circuit 306 (surrounded by broken lines in FIG. 3) and thereby controls the operation of the gas compressor 36. The fuel reformer control unit 538 outputs a control signal to a reformer drive circuit 307 (surrounded by broken lines in FIG. 3) and thereby controls the operation of the fuel reformer 37.

(Operation Control of Fuel Reformer)

The fuel reformer control unit 538 controls the operation level of the fuel reformer 37 based on the required premixed gas quantity (hydrogen addition concentration) Rgsol calculated by the required premixed gas calculating unit 533, while also controlling the flow rate of the pure water supplied to the fuel reformer 37 from a water tank 38 and the flow rate of the fuel supplied to the fuel reformer 37 from the fuel tank 42 accordingly.

(Control of Hydrogen Tank Pressure)

A target tank pressure PHbsol of the hydrogen tank 34B is calculated by the tank pressure control unit 536 by referring to a two-dimensional map 536a (having the required torque Trqsol and the engine revolution speed Ne as the parameters) which has been experimentally prepared and electronically stored in the ROM 203 (see FIG. 3). The tank pressure control unit 536 controls the tank pressure PHb to equalize it with the target tank pressure PHbsol by controlling the gas compressor 36.

Since a lower limit has been set for the target tank pressure PHbsol, the tank pressure PHb is controlled so as not to fall below a prescribed pressure even when the engine 1 is stopped or idling. The lower limit is employed so that the premixed gas can be supplied to the engine 1 (by use of the pressure of the premixed gas stored in the hydrogen tank 34B) even in the period between startup of the engine 1 and activation of the fuel reformer 37. Concretely, the control of the tank pressure PHb can be performed as described in FIG. 3 of Japanese Laid-open Patent Publication No. 2010-014085, for example.

The header pressure calculating unit 531 calculates the target header pressure Pgsol similarly to the first embodiment and the header pressure control unit 532 controls the pressure regulating valve 33 to equalize the header pressure $P_g$ with the target header pressure Pgsol.

Incidentally, when the fuel reformer 37 has already reached a normal operation level (running state), the target header pressure Pgsol is slightly lower than the target tank pressure PHbsol calculated and used for control by the tank pressure control unit 536.

(Premixed Gas Injection Control)

The required premixed gas calculating unit 533 calculates the required premixed gas quantity Rgsol by referring to the optimum thermal efficiency map 603 (two-dimensional map for determining the required premixed gas quantity Rgsol) by use of the required torque Trqsol obtained by the required torque calculating unit 501 and the engine revolution speed Ne similarly to the first embodiment. Using the required premixed gas quantity Rgsol and the target new air flow FAsol calculated by the target new air flow calculating unit 507, a required premixed gas quantity correcting unit 534B checks whether the ratio between the volume concentration of hydrogen contained in the required premixed gas quantity Rgsol (converted value under the standard atmospheric pressure) and the target new air flow FAsol (converted value under the standard atmospheric pressure) exceeds a minimum combustible ratio or not. When the ratio does not exceed the minimum combustible ratio, the required premixed gas quantity correcting unit 534B corrects the value of the required premixed gas quantity Rgsol so that the ratio exceeds the minimum combustible ratio and then outputs the corrected value to the premixed gas injection control unit 535. Incidentally, while it was possible to assume constant hydrogen concentration in the premixed gas in the first embodiment, changes in the hydrogen concentration in the premixed gas are considered in the second embodiment since the composition (ingredients) of the fuel can vary from the standard composition. Thus, the header pipe 32 in the second embodiment is equipped with the hydrogen concentration sensor $S_H$ for detecting the hydrogen concentration $v_H$ in the premixed gas and the check on whether the ratio between the volume concentration of hydrogen (converted value under the standard atmospheric pressure) and the target new air flow FAsol (converted value under the standard atmospheric pressure) exceeds the minimum combustible ratio or not is executed by incorporating the detected hydrogen concentration $v_H$.

The premixed gas injection control unit 535 calculates the injection time corresponding to the required premixed gas quantity Rgsol based on the header pressure $P_g$ detected by the header pressure sensor $S_{Phg}$, calculates the maximum permissible injection time $T_{max}$ during which the exhaust valve 17 is totally closed and the intake valve 16 is open (see FIG. 10) based on the current value of the engine revolution speed Ne, checks whether the injection time is within the maximum permissible injection time $T_{max}$ or not, and instructs the header pressure control unit 532 to increase the header pressure $P_g$ when the injection time is not within the maximum permissible injection time $T_{max}$. The premixed gas injection control unit 535 outputs control signals representing the injection timing and the injection time to the gas injector drive circuit 302 so that the actuator 31a of the gas injector 31 is driven accordingly.

Incidentally, the "gas supply control unit" may be formed by the header pressure calculating unit 531, the header pressure control unit 532, the required premixed gas calculating unit 533, the premixed gas injection control unit 535, the tank pressure control unit 536 and the fuel reformer control unit 538.

By the second embodiment described above, practical PCCI combustion is realized up to the middle/high-load operation area (including the regular operation area) as shown in FIG. 12, similarly to the first embodiment.

Since the total capacity of the header pipe 32 and the gas supply pipes 76 is restricted and the pressure regulating valve 33 for controlling the header pressure $P_g$ is provided downstream of the hydrogen tank 34B in this embodiment, the pressure in the header pipe 32 and the gas supply pipes 76 can be changed properly depending on the engine revolution speed Ne, which makes it possible to set the injection time $(T_{Pi})$ of the premixed gas within a narrow variation range corresponding to the engine revolution speed Ne while keeping the injection time $T_{Pi}$ within the maximum permissible injection time $T_{max}$ and also avoiding a too short injection time $T_{Pi}$. Consequently, excellent responsiveness of the premixed gas supply to changes in the engine revolution speed Ne can be achieved.

Further, since the premixed gas (hydrogen or reformed gas containing hydrogen) is generated by the fuel reformer 37 from the fuel, supply of the premixed gas to the engine 1 by use of a special source of the premixed gas becomes unnecessary, which is convenient and advantageous for the operation of the engine 1. By the employment of the gas compressor 36 and the hydrogen tank 34B, downsizing of the fuel reformer 37 is made possible, and consequently, the cost and weight of the whole gas supply system 130B employing the fuel reformer 37 can be reduced.

As a modification of this embodiment, it is also possible to keep the pressure PHb of the hydrogen tank 34B approximately at the maximum pressure (instead of changing and controlling the tank pressure PHb depending on the engine revolution speed Ne and the accelerator angle $\theta_{th}$ as shown in FIG. 18) while flexibly performing the control of the header pressure $P_g$ (by use of the pressure regulating valve 33) depending on the engine revolution speed Ne and the accelerator angle $\theta_{th}$. With this configuration, the reactor of the fuel reformer 37 employed for the gas supply system 130B can be downsized further.

Incidentally, while the reduction of the NO generation rate has been mentioned above as an example of the advantage of the embodiments for PCCI combustion, the above embodiments are also effective for reducing the generation rates of other nitrogen oxides (so-called NOX).

As described above, by the embodiments in accordance with the present invention, a control device for an internal combustion engine employing PCCI combustion, capable of realizing high-stability operation of the engine throughout a large operation area of the engine, can be provided.

While a description has been given above of preferred embodiments in accordance with the present invention, the present invention is not to be restricted by the particular illustrative embodiments and a variety of modifications, design changes, etc. are possible without departing from the scope and spirit of the present invention described in the appended claims.

What is claimed is:

1. A control device for an internal combustion engine operable with light oil or mixed fuel containing light oil, comprising:
   a fuel supply unit which supplies the light oil or the mixed fuel containing light oil to the internal combustion engine;
   a gas supply unit which supplies hydrogen to the internal combustion engine;
   a combustion control unit which controls combustion in the internal combustion engine by use of combustion data related to hydrogen addition concentration previously obtained from multiple combustion waveforms changing depending on the hydrogen addition concentration; and
   a hydrogen addition quantity determining unit which determines the addition concentration of the hydrogen to be supplied to the internal combustion engine by selecting appropriate data from the combustion data related to the hydrogen addition concentration so as to achieve high thermal efficiency based on status of the internal combustion engine, wherein the determined addition concentration of the hydrogen is in a range of 4 to 16 volume percentage relative to intake air of the internal combustion engine.

2. The control device for an internal combustion engine according to claim 1, wherein the status of the internal combustion engine includes at least revolution speed of the internal combustion engine and required torque as torque that the internal combustion engine is required to output.

3. The control device for an internal combustion engine according to claim 1, further comprising an injection timing determining unit which determines injection timing of the light oil or the mixed fuel containing light oil based on the status of the internal combustion engine and the hydrogen addition concentration determined by the hydrogen addition quantity determining unit.

4. The control device for an internal combustion engine according to claim 3, wherein the status of the internal combustion engine includes at least revolution speed of the internal combustion engine and required torque as torque that the internal combustion engine is required to output.

5. A control device for an internal combustion engine operable with light oil or mixed fuel containing light oil, comprising:
   a fuel supply unit which supplies the light oil or the mixed fuel containing light oil to the internal combustion engine;
   a gas generating unit which generates reformed gas containing hydrogen from the light oil or the mixed fuel containing light oil;
   a gas supply unit which supplies the reformed gas containing hydrogen to the internal combustion engine;

a combustion control unit which controls combustion in the internal combustion engine by use of combustion data related to hydrogen addition concentration previously obtained from multiple combustion waveforms changing depending on the hydrogen addition concentration; and a hydrogen addition quantity determining unit which determines the addition concentration of the hydrogen to be supplied to the internal combustion engine by selecting appropriate data from the combustion data related to the hydrogen addition concentration so as to achieve high thermal efficiency based on status of the internal combustion engine.

6. The control device for an internal combustion engine according to claim 5, wherein the status of the internal combustion engine includes at least revolution speed of the internal combustion engine and required torque as torque that the internal combustion engine is required to output.

7. The control device for an internal combustion engine according to claim 5, further comprising an injection timing determining unit which determines injection timing of the light oil or the mixed fuel containing light oil based on the status of the internal combustion engine and the hydrogen addition concentration determined by the hydrogen addition quantity determining unit.

8. The control device for an internal combustion engine according to claim 7, wherein the status of the internal combustion engine includes at least revolution speed of the internal combustion engine and required torque as torque that the internal combustion engine is required to output.

9. A control device for an internal combustion engine using light oil or mixed fuel containing light oil as fuel and igniting the fuel in each combustion chamber by compressing the fuel, comprising:

a fuel supply unit which supplies the fuel to each cylinder of the internal combustion engine;

a gas supply unit which supplies premixed gas containing hydrogen to each cylinder of the internal combustion engine;

a required torque calculating unit which calculates required torque, as torque that should be outputted by the internal combustion engine, based on an accelerator angle and revolution speed of the internal combustion engine;

a fuel injection quantity calculating unit which calculates fuel injection quantity, as quantity of the fuel to be injected into each cylinder, based on the revolution speed of the internal combustion engine and the required torque calculated by the required torque calculating unit;

a fuel supply control unit which controls injection timing and injection time of the fuel injected by the fuel supply unit into each cylinder based on PCCI (Premixed Charge Compression Ignition) combustion conditions of the internal combustion engine and the fuel injection quantity calculated by the fuel injection quantity calculating unit;

a hydrogen addition concentration-related combustion data storage unit which stores combustion data related to hydrogen addition concentration previously obtained from multiple combustion waveforms changing depending on the hydrogen addition concentration, while using operational status information on the internal combustion engine, including at least the revolution speed of the internal combustion engine and the required torque calculated by the required torque calculating unit, as parameters;

a hydrogen addition quantity determining unit which determines the quantity of the hydrogen to be supplied to each cylinder of the internal combustion engine by calculating a target hydrogen addition concentration achieving optimum thermal efficiency of the internal combustion engine by referring to the operational status information on the internal combustion engine and using the combustion data related to the hydrogen addition concentration stored in the hydrogen addition concentration-related combustion data storage unit; and a gas supply control unit which controls injection timing and injection time of the premixed gas injected by the gas supply unit into each cylinder based on the PCCI combustion conditions of the internal combustion engine and the quantity of the hydrogen to be supplied to each cylinder determined by the hydrogen addition quantity determining unit.

10. The control device for an internal combustion engine according to claim 9, wherein the operational status information on the internal combustion engine includes at least the revolution speed of the internal combustion engine and the required torque.

11. The control device for an internal combustion engine according to claim 9, further comprising an exhaust NOX concentration storage unit which stores exhaust NOX concentration data previously estimated corresponding to at least the operational status information on the internal combustion engine and the injection timing of the fuel, wherein after the determination of the target hydrogen addition concentration achieving the optimum thermal efficiency of the internal combustion engine by the hydrogen addition quantity determining unit, the fuel supply control unit determines the injection timing of the fuel by referring to the operational status information on the internal combustion engine and using the exhaust NOX concentration data stored in the exhaust NOX concentration storage unit.

12. The control device for an internal combustion engine according to claim 11, wherein the operational status information on the internal combustion engine includes at least the revolution speed of the internal combustion engine and the required torque.

13. A control device for an internal combustion engine using light oil or mixed fuel containing light oil as fuel and igniting the fuel in each combustion chamber by compressing the fuel, comprising:

a fuel supply unit which supplies the fuel to each cylinder of the internal combustion engine;

a gas generating unit which generates hydrogen or reformed gas containing hydrogen as premixed gas from the fuel;

a gas supply unit which supplies the premixed gas to each cylinder of the internal combustion engine;

a required torque calculating unit which calculates required torque, as torque that should be outputted by the internal combustion engine, based on an accelerator angle and revolution speed of the internal combustion engine;

a fuel injection quantity calculating unit which calculates fuel injection quantity, as quantity of the fuel to be injected into each cylinder, based on the revolution speed of the internal combustion engine and the required torque calculated by the required torque calculating unit;

a fuel supply control unit which controls injection timing and injection time of the fuel injected by the fuel supply unit into each cylinder based on PCCI (Premixed Charge Compression ignition) combustion conditions of the internal combustion engine and the fuel injection quantity calculated by the fuel injection quantity calculating unit;

a hydrogen addition concentration-related combustion data storage unit which stores combustion data related to hydrogen addition concentration previously obtained from multiple combustion waveforms changing depending on the hydrogen addition concentration, the combustion data using operational status information on the internal combustion engine, including at least the revolution speed of the internal combustion engine and the required torque calculated by the required torque calculating unit, as parameters;

a hydrogen addition quantity determining unit which determines the quantity of the hydrogen to be supplied to each cylinder of the internal combustion engine by calculating a target hydrogen addition concentration achieving optimum thermal efficiency of the internal combustion engine by referring to the operational status information on the internal combustion engine and using the combustion data related to the hydrogen addition concentration stored in the hydrogen addition concentration-related combustion data storage unit; and a gas supply control unit which controls injection timing and injection time of the premixed gas injected by the gas supply unit into each cylinder based on the PCCI combustion conditions of the internal combustion engine and the quantity of the hydrogen to be supplied to each cylinder determined by the hydrogen addition quantity determining unit, wherein the gas supply unit includes:

a gas compressor which compresses the premixed gas generated by the gas generating unit;

a pressure accumulator tank which stores the compressed premixed gas in a pressure-accumulated state; and gas injection valves each of which injects the premixed gas supplied from the pressure accumulator tank via each gas supply pipe branching into each cylinder of the internal combustion engine.

14. The control device for an internal combustion engine according to claim 13, wherein the operational status information on the internal combustion engine includes at least the revolution speed of the internal combustion engine and the required torque.

15. The control device for an internal combustion engine according to claim 13, further comprising an exhaust NOX concentration storage unit which stores exhaust NOX concentration data previously estimated corresponding to at least the operational status information on the internal combustion engine and the injection timing of the fuel, wherein after the determination of the target hydrogen addition concentration achieving the optimum thermal efficiency of the internal combustion engine by the hydrogen addition quantity determining unit, the fuel supply control unit determines the injection timing of the fuel by referring to the operational status information on the internal combustion engine and using the exhaust NOX concentration data stored in the exhaust NOX concentration storage unit.

16. The control device for an internal combustion engine according to claim 15, wherein the operational status information on the internal combustion engine includes at least the revolution speed of the internal combustion engine and the required torque.

* * * * *